United States Patent
Garrard et al.

(10) Patent No.: US 11,060,466 B2
(45) Date of Patent: Jul. 13, 2021

(54) SYSTEM AND METHOD FOR CONTROLLING AN ELECTRONICALLY-CONTROLLED TURBOCHARGER

(71) Applicant: BorgWarner Inc., Auburn Hills, MI (US)

(72) Inventors: Tyler R. Garrard, Arden, NC (US); Christopher Meszaros, Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/353,186

(22) Filed: Mar. 14, 2019

(65) Prior Publication Data

US 2019/0211759 A1 Jul. 11, 2019

Related U.S. Application Data

(63) Continuation of application No. 15/313,422, filed as application No. PCT/US2015/035876 on Jun. 15, 2015, now Pat. No. 10,267,246.

(Continued)

(51) Int. Cl.
*F02B 37/10* (2006.01)
*F02D 41/02* (2006.01)
(Continued)

(52) U.S. Cl.
CPC .......... *F02D 41/0007* (2013.01); *F02B 33/40* (2013.01); *F02B 37/004* (2013.01);
(Continued)

(58) Field of Classification Search
CPC ................. F02B 39/10; F02D 41/0007; F02D 41/00–41/0062
See application file for complete search history.

(56) References Cited

U.S. PATENT DOCUMENTS

| 4,981,017 A | 1/1991 | Hara et al. |
| 5,105,624 A | 4/1992 | Kawamura |

(Continued)

FOREIGN PATENT DOCUMENTS

| AU | 20048759 B2 | 1/2001 |
| CN | 102200061 A | 9/2011 |

(Continued)

OTHER PUBLICATIONS

Chinese First Office Action dated Aug. 3, 2018 of co-pending Chinese Patent Application No. 201580032873.3.

(Continued)

*Primary Examiner* — David R Morris
*Assistant Examiner* — Lillian T Nguyen
(74) *Attorney, Agent, or Firm* — Barnes & Thornburg LLP

(57) ABSTRACT

A system and method is provided for controlling an electric machine rotatably coupled to a rotatable shaft of an electronically-controlled one of a turbocharger and an exhaust-driven turbo supercharger fluidly coupled to an exhaust duct of an internal combustion engine. An operating temperature of a component of the engine is determined or estimated an operating temperature of a component of the engine or coupled to the engine, which is compared to a threshold temperature. The electric machine is controlled to operate as a motor in response to the determined or estimated temperature of the component being below a threshold temperature.

9 Claims, 17 Drawing Sheets

Related U.S. Application Data

(60) Provisional application No. 62/012,399, filed on Jun. 15, 2014.

(51) Int. Cl.

| | | |
|---|---|---|
| *F02D 41/00* | (2006.01) | |
| *F02B 37/013* | (2006.01) | |
| *F02D 23/00* | (2006.01) | |
| *F02B 33/40* | (2006.01) | |
| *F02B 37/00* | (2006.01) | |
| *F02B 39/10* | (2006.01) | |
| *F02M 26/05* | (2016.01) | |
| *F02M 26/08* | (2016.01) | |

(52) U.S. Cl.
CPC ........... *F02B 37/013* (2013.01); *F02B 37/10* (2013.01); *F02B 39/10* (2013.01); *F02D 23/00* (2013.01); *F02D 41/023* (2013.01); *F02M 26/05* (2016.02); *F02M 26/08* (2016.02); *F02D 41/0062* (2013.01); *F02D 2200/1002* (2013.01); *Y02T 10/12* (2013.01)

(56) References Cited

U.S. PATENT DOCUMENTS

| | | | |
|---|---|---|---|
| 6,055,812 A | | 5/2000 | Trumbower |
| 7,165,399 B2 | | 1/2007 | Stewart |
| 7,237,381 B2 | | 7/2007 | Kolavennu et al. |
| 7,261,086 B2 | | 8/2007 | Nuang |
| 8,056,320 B2 * | | 11/2011 | Gonze .................. F01N 3/2006 60/284 |
| 8,136,391 B2 | | 3/2012 | Martin et al. |
| 8,156,730 B2 | | 4/2012 | Guo et al. |
| 8,225,608 B2 | | 7/2012 | Wu et al. |
| 8,371,108 B2 | | 2/2013 | Chyo |
| 8,505,281 B2 | | 8/2013 | Guo et al. |
| 8,776,767 B2 | | 7/2014 | Ouwenga et al. |
| 9,567,950 B2 | | 2/2017 | Russ |
| 2006/0236692 A1 * | | 10/2006 | Kolavennu et al. .. F01N 3/0807 |
| 2007/0295067 A1 * | | 12/2007 | Rollinger et al. .... G01M 15/09 |
| 2009/0301451 A1 | | 12/2009 | Ito |
| 2009/0320468 A1 * | | 12/2009 | Shimizu et al. ........ F02B 37/10 |
| 2011/0094486 A1 | | 4/2011 | Vuk |
| 2011/0146270 A1 | | 6/2011 | Guo et al. |
| 2013/0276754 A1 * | | 10/2013 | Breuer et al. ........... F02B 33/00 |
| 2013/0296117 A1 | | 11/2013 | Shelton et al. |
| 2014/0109075 A1 | | 1/2014 | Hoffman et al. |
| 2015/0345371 A1 * | | 12/2015 | Russ et al. ............... F02B 29/04 |
| 2016/0237931 A1 * | | 8/2016 | Pappenheimer et al. ................... F02D 41/0245 |

FOREIGN PATENT DOCUMENTS

| | | |
|---|---|---|
| DE | 10164792 A1 | 7/2003 |
| DE | 10332043 A1 | 2/2005 |
| EP | 0367406 A2 | 5/1990 |
| EP | 1070837 A2 | 1/2001 |
| JP | 02264130 A | 10/1990 |
| KR | 10-2001-0101148 A | 11/2001 |
| KR | 10-2013-0037223 A | 4/2013 |

OTHER PUBLICATIONS

Terdich et al. "Mild Hybridization via Electrification of the Air System: Electrically Assisted and Variable Geometry Turbocharging Impact on an Off-Road Diesel Engine"—Journal of Engineering for Gas Turbines and Power, vol. 136 (Mar. 2014), pp. 1-12.
PCT Search Report and Written Opinion for corresponding PCT/US2015/035876, completed on Sep. 7, 2015.
Supplementary Extended European Search Report for co-pending European Application No. 15810457 dated Jan. 18, 2018.

* cited by examiner

SYSTEM AND METHOD FOR CONTROLLING AN ELECTRONICALLY-CONTROLLED TURBOCHARGER

CROSS-REFERENCE TO RELATED APPLICATIONS

This is a continuation of U.S. patent application Ser. No. 15/313,422, filed Nov. 22, 2016, which is a U.S. National Stage entry of International Patent Application No. PCT/US2015/035876, filed Jun. 15, 2015, which claims the benefit of and priority to U.S. Provisional Patent Application Ser. No. 62/012,399, filed Jun. 15, 2014, the disclosures of which are all expressly incorporated herein by reference in their entireties.

FIELD OF THE INVENTION

The present disclosure relates to an electronically-controlled turbocharger (ECT) integrated with an internal combustion engine and systems and methods for controlling such an integrated ECT.

BACKGROUND

It may be desirable to develop control strategies for controlling ECTs integrated with internal combustion engines. Some such control strategies are disclosed herein.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1A:
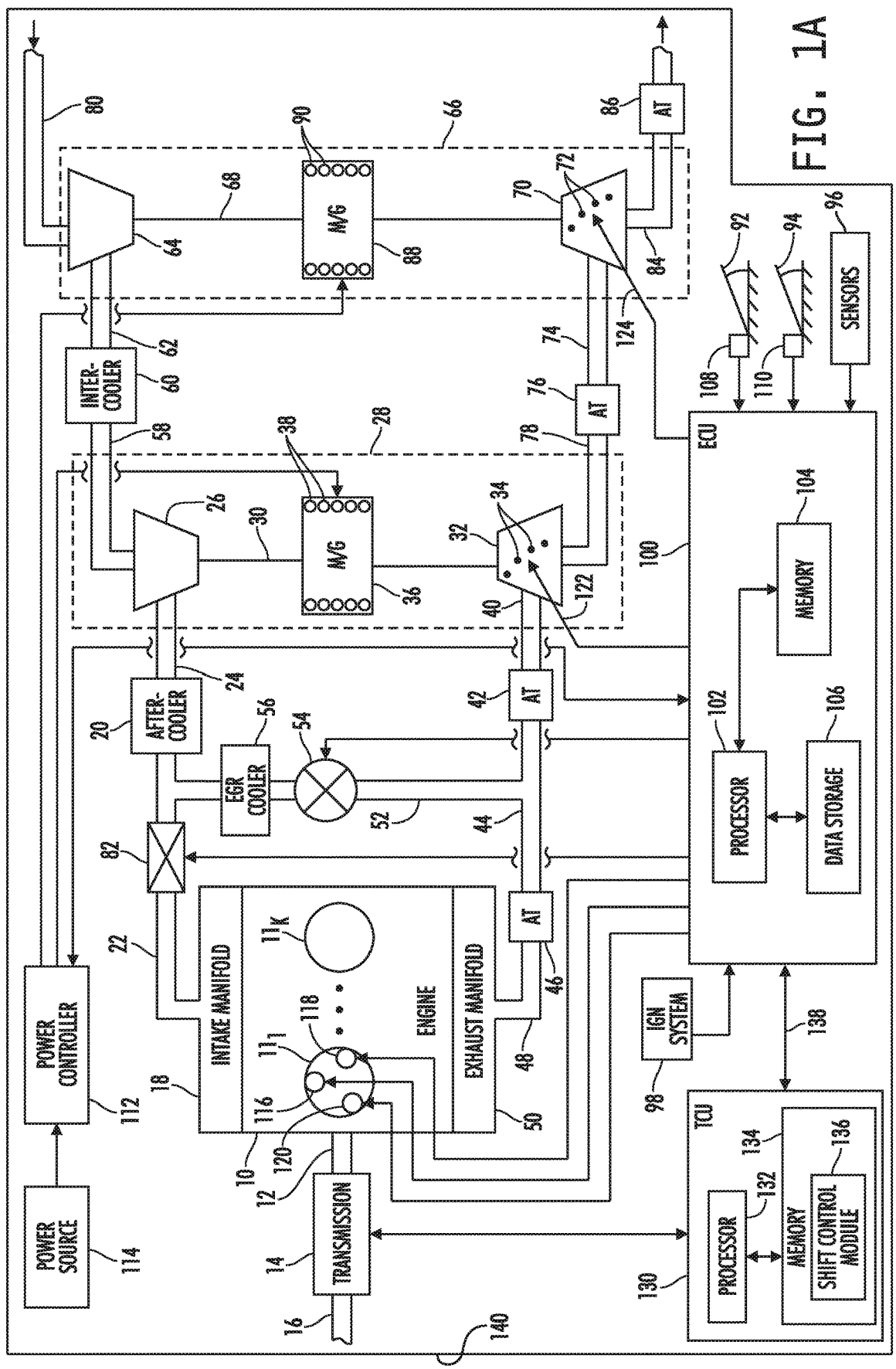
FIG. 1A is a simplified block diagram of an embodiment of a system for controlling an electronically-controllable turbocharger integrated with an internal combustion engine.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the invention may be implemented in hardware, firmware, software, or any combination thereof. Embodiments of the invention may also be implemented as instructions stored on one or more machine-readable media, which may be read and executed by one or more processors. A machine-readable medium may be embodied as any device or physical structure for storing or transmitting information in a form readable by a machine (e.g., a computing device). For example, a machine-readable medium may be embodied as any one or combination of read only memory (ROM); random access memory (RAM); magnetic disk storage media; optical storage media; flash memory devices; and others.

Some aspects of the subject matter of this disclosure are illustrated in the accompanying drawings in the form of flowcharts each depicting processes performed by one or more processors also illustrated in the drawings. In some such flowcharts one or more of the illustrated steps may be represented by dashed-lined shapes to illustrate that such steps are optional in the depicted processes and may therefore be omitted in some embodiments of such processes. It will be understood that those steps represented by solid-lined shapes represent process steps that form part of the illustrated processes, but that one or more such steps may, in some embodiments, likewise be omitted or may be modified to include one or more additional or fewer requirements than those detailed in the illustrated processes.

Referring now to FIG. 1A, a simplified block diagram is shown of embodiment of a system for controlling an electronically controllable turbocharger integrated with an internal combustion engine. Various embodiments are described herein for controlling the operation of one or more such electronically controllable turbochargers purposes assisting and/or achieving various operating goals of the engine, of a transmission coupled thereto and/or of a motor vehicle carrying at least the engine.

In the illustrated embodiment, an internal combustion engine 10 is coupled to a transmission 14 via a rotatable output drive shaft 12 of the engine 10. In some embodiments, the transmission 14 may be any type of transmission that has discrete gears in which a shift from one gear to another occurs in response to a change in operating demand. In other embodiments, the transmission 14 may be a continuous variable transmission (CVT) having a continuously variable gear ratio. In still other embodiments, the transmission 14 may be a hybrid transmission, e.g., having an electric drive and a set of selectable gears. The transmission 14 may illustratively be an automatic transmission, e.g., having a plurality of selectable gears or continuously variable gear ratio, in which shifting between such gears or varying the continuously variable gear ratio is automatically controlled by a transmission control unit (TCU) 130. In other embodiments, the transmission 14 may have any number of manually selectable gears.

The engine 10 includes a number of cylinders $11_1$-$11_K$, wherein K may be any positive integer. Each cylinder 11, or subset of cylinders 11, is illustratively provided with a fuel injector 116, which may be directly coupled to a combustion chamber in the cylinder 11 as illustrated in FIG. 1A, or may alternatively be coupled to a fuel intake port associated with the cylinder 11, depending on the type of engine 10. If the engine 10 is a spark-ignition engine, a spark plug 118 is further illustratively provided in or in communication with each cylinder 11.

An intake manifold 18 of the engine 10 is fluidly coupled to a compressor 26 of an electronically-controlled turbocharger (ECT) 28 via a conduit 22. In some embodiments, the conduit 22 may be coupled to an outlet of a conventional aftercooler 20, and an inlet of the aftercooler 20 may be coupled to an outlet of the compressor 26 via another conduit 24. In other embodiments, the aftercooler 20 may be omitted, and the conduit 22 may be coupled directly between the intake manifold 18 and the air outlet of the compressor 26. In some embodiments, a conventional air intake throttle 82 may be interposed in the conduit 20 such that an air inlet of the air intake throttle 82 is fluidly coupled to the conduit 22 downstream of a junction of the conduit 22 and an exhaust gas recirculation conduit 52 (in embodiments which include the exhaust gas recirculation conduit 52), and an air outlet of the air intake throttle 82 is fluidly coupled to the intake manifold 18. The air intake throttle 82 is illustratively electronically controllable to selectively control the flow rate of air into the intake manifold 18.

The compressor 26 of the ECT 28 is mechanically coupled to a turbine 32 via a rotatable shaft 30. In some embodiments, the turbine 32 is a variable geometry turbine (VGT) 32 having a plurality of different, selectable turbine geometries each resulting in the turbine 32 having a different exhaust gas swallowing capacity. In the embodiment illustrated in FIG. 1A, the turbine 32 is shown having a plurality of different VGT positions 34, wherein the different selectable swallowing capacities are achieved by electronically controlling an actuator 122 to a different one of the discrete VGT positions 34. Also coupled to the turbocharger shaft 30 is an electric machine 36. When electrical energy is provided to coils 38 of the electric machine 36, it acts as a motor which drives the rotatable shaft 30, and when electrical energy is extracted from the coils 38 of the electric machine 36, it acts a generator which loads, i.e., applies a retarding force, to the rotatable shaft 30. When operating as a motor, the electric machine 36 is illustratively a high speed machine capable of rotating the shaft 30 at a much higher rotational speed than when driven by the turbine 32 alone, and is also a highly responsive machine capable of generating high turbocharger shaft rotational speeds much more quickly than when driven by the turbine 32 alone.

An exhaust gas inlet of the turbine 32 is fluidly coupled to a conduit 40 which is also illustratively coupled to an exhaust gas outlet of an exhaust gas aftertreatment device 42. An exhaust gas inlet of the exhaust gas aftertreatment device 42 is, in one embodiment, fluidly coupled directly to an exhaust manifold 50 of the engine 10 via a conduit 44. In some embodiments, an exhaust gas recirculation (EGR) arrangement may be interposed between the intake manifold 18 and the exhaust manifold 50 as illustrated in FIG. 1A. In such embodiments, an exhaust gas recirculation conduit 52 may be coupled to the exhaust gas conduit and to one end of an EGR valve 54. An opposite end of the EGR valve 54 may illustratively be coupled to an exhaust gas inlet of an EGR cooler 56, and an exhaust gas outlet of the EGR cooler 56 may be coupled to the intake air conduit 22. The EGR valve is illustratively electronically controllable to selectively allow passage of controllable amounts of exhaust gas produced by the engine 10 into the intake manifold 18 in a conventional manner. Further in such embodiments, an exhaust gas outlet of another exhaust gas aftertreatment device 46 may be coupled to the exhaust gas conduit 44 upstream of the junction of the exhaust gas conduit 44 and the EGR conduit 52, and an exhaust gas inlet of the exhaust gas aftertreatment device 46 may be coupled directly to the exhaust manifold 50 via an exhaust gas conduit 48. In some embodiments, an oxidation catalyst may be provided in the EGR duct 52 in place of, or in addition to, the EGR cooler 56.

In some embodiments, the engine 10 may have a single ECT 28 coupled thereto as just described. In other embodiments, an air inlet of the compressor 26 of the ECT 28 may be fluidly coupled to a compressor 64 of another electronically-controlled turbocharger (ECT) 66 via a conduit 58. In some such embodiments, the conduit 58 may be coupled to an outlet of another conventional intercooler 60, and an inlet of the intercooler 60 may be coupled to an air outlet of the compressor 64 via another conduit 62. In other embodiments, the intercooler 60 may be omitted, and the conduit 58 may be coupled directly between the air inlet of the compressor 26 of the ECT 28 and the air outlet of the compressor 64 of the ECT 66.

The compressor 64 of the ECT 66 is mechanically coupled to a turbine 70 via a rotatable shaft 68. In some embodiments, the turbine 32 is a variable geometry turbine (VGT) 70 having a plurality of different, selectable turbine geometries each resulting in the turbine 70 having a different exhaust gas swallowing capacity as described above with respect to the turbine 32 of the ECT 28. In the embodiment illustrated in FIG. 1A, the turbine 70 is shown having a plurality of different VGT positions 72, wherein the different selectable swallowing capacities are achieved by electronically controlling an actuator 1124 to a different one of the discrete VGT positions 72. Also coupled to the turbocharger shaft 68 is another electric machine 88. When electrical energy is provided to coils 90 of the electric machine 88, it acts as a motor which drives the rotatable shaft 68, and when electrical energy is extracted from the coils 90 of the electric machine 88, it acts a generator which loads, i.e., applies a retarding force, to the rotatable shaft 68. When operating as a motor, the electric machine 88 is illustratively a high speed machine capable of rotating the shaft 68 at a much higher rotational speed than when driven by the turbine 70 alone, and is also a highly responsive machine capable of generating high turbocharger shaft rotational speeds much more quickly than when driven by the turbine 70 alone.

An exhaust gas inlet of the turbine 70 is fluidly coupled to a conduit 74 which is also illustratively coupled to an exhaust gas outlet of another exhaust gas aftertreatment device 76. An exhaust gas inlet of the exhaust gas aftertreatment device 76 is fluidly coupled to the exhaust gas outlet of the turbine 32 of the ECT 28 via a conduit 78.

In the illustrated embodiment, an air inlet of the compressor 64 of the ECT 66 is fluidly coupled to ambient via which it receives fresh air. An exhaust gas conduit 84 is coupled to an exhaust gas outlet of the turbine 70 and to an exhaust gas inlet of yet another exhaust gas aftertreatment device 86 from which exhaust gas is expelled to ambient. In the illustrated embodiment, the compressor 64 operates as a low pressure compressor and the compressor 26 operates as a high pressure compressor.

It will be understood that this disclosure contemplates variants of the embodiment illustrated in FIG. 1A. Some embodiments, for example, may include only one of the turbochargers 28, 66. As another example, in embodiments which include both turbochargers 28, 66, only one of the turbochargers 28, 66 may be an ECT and the other a conventional turbocharger, i.e., one without an electric machine 36, 88. In either such embodiments, one or both of the turbines 32, 70 may be a fixed-geometry turbine. In any such embodiments, the EGR conduit 52, valve 54 and, in some embodiments, the EGR cooler 56, may be alternatively or additionally positioned downstream of the turbocharger 28 and/or 66, i.e., between the air inlet of the compressor 26, 64 and the exhaust gas outlet of the turbine 32, 70. In some embodiments, one or both of the intercooler 60 and the aftercooler 20 may be omitted. In some embodiments, the air intake throttle 82 may alternatively be interposed along the intake air conduit 22 upstream of the junction of the conduit 22 with the EGR conduit 52, or may be omitted altogether. Some embodiments may include only a single one of the exhaust gas aftertreatment devices 42, 46, 76, 86 or any combination thereof, and other embodiments may omit all such exhaust gas aftertreatment devices. In embodiments which include one or more of the exhaust gas aftertreatment devices 42, 46, 76, 86, any such device may be or include any one or combination of filters, catalysts (e.g., including one or more three-way catalysts for use with engines that operate at stoichiometry and/or selective reduction catalysts) for reducing or removing particulate matter, NOx, SOx, CO, hydrocarbons and/or other components in or from exhaust gas produced by the engine 10, and/or one or more conventional close-coupled or other oxidation catalysts or other devices or systems for generating exothermic heat for the purpose of regenerating one or more downstream aftertreatment devices.

In any of the foregoing embodiments, one or both of the turbines 32, 70 may alternatively operate as a conventional exhaust turbine to extract exhaust energy and, in such embodiments one or both of the compressors 26, 64 may be omitted. In yet another alternative, one or both of the compressors 26, 64 may operate as a so-called "e-booster" to supply additional air to the combustion chamber(s) of the cylinder(s) 11, and in such embodiments one or both the turbines 32, 70 may be omitted.

In the embodiment illustrated in FIG. 1A, operation of the engine 10, the air handling system just described, and/or the electric machine(s) 36, 88 is controlled by an engine control unit (ECU) 100. Illustratively, the ECU 100 includes at least one conventional processor 102, at least one memory unit 104 and at least one data storage unit 106. The at least one data storage unit 106 illustratively has stored therein operating data for use by the ECU 100 with one or more conventional feed-forward control strategies and may also be operable to store, under control of the processor 102, data produced by such operation for use with one or more conventional feedback control strategies. Illustratively, the memory 104 has stored therein a plurality of sets of instructions which are executable by the processor 102 to carry out all such control strategies to control operation of the engine 10, air handling system and/or electric machine(s). Examples of some such control strategies will be described in detail hereinafter with respect to FIGS. 1C-14.

The ECU 100 is operable to control operation of the engine 10, air handling system (e.g., turbocharger(s) 28 and/or 66, EGR valve 54, and/or air intake throttle 82) and/or electric machine(s) 36, 88 based, at least in part, on sensory data produced by one or more of a plurality of sensors 96 variously positioned in and about the engine 10 and air handling system. In addition to such sensors 96, the engine 10 further illustratively includes a conventional ignition system 98 having a key switch or similar device having conventional "on," "off" and "crank" positions or states. In the "on" state of the ignition system 98, the engine 10 is either running or, if not running, the electrical system of a motor vehicle 140 in which all of the components illustrated in FIG. 1A are carried is activated and supplying electrical energy to all componentry to which it is connected. In the "crank" state, the engine 10 is in the process of being started, and in the "off" state, the engine 10 is not running and the electrical system of the motor vehicle 140 is deactivated such that it supplies only minimal amounts of electrical energy to some of the electrical components to keep them electrically active.

Figure 1B:
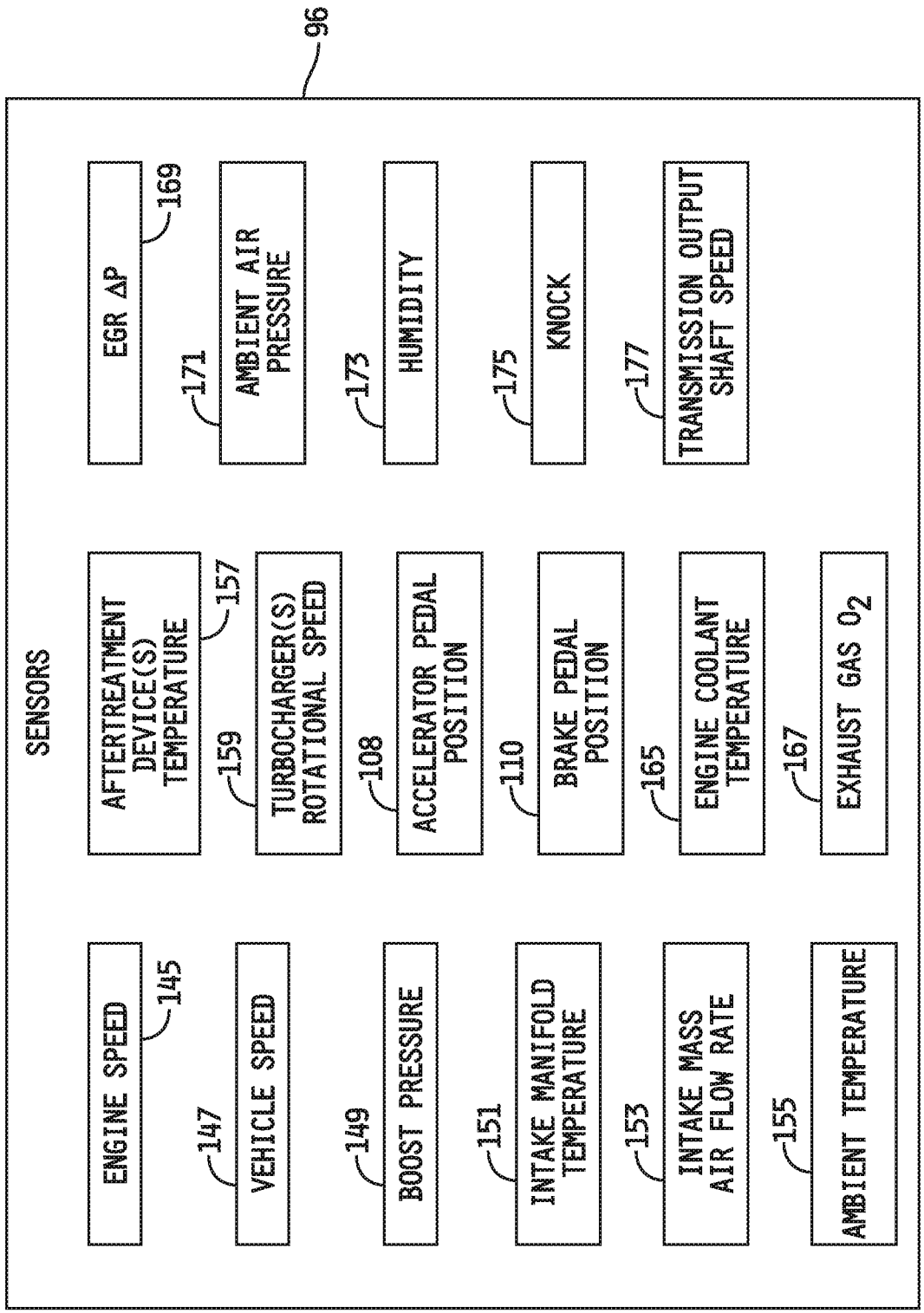
FIG. 1B is a simplified block diagram showing an example set of the sensors illustrated in FIG. 1A.

Referring now to FIG. 1B, examples of the some of the plurality of sensors 96 illustrated in FIG. 1A are shown. It will be understood that the sensors 96 illustrated in FIG. 1B are provided only by way of example, and that different embodiments of the system illustrated in FIG. 1A may use more, fewer and/or different sensors that those illustrated in FIG. 1B. In any case, the sensors 96 may include, but are not limited to, and one or more engine speed sensors 145, one or more vehicle speed sensors 147, one or more boost pressure sensors 149, one or more intake manifold temperature sensors 151, one or more intake mass airflow sensors 153, one or more ambient temperature sensors 155, one or more aftertreatment device temperature sensors, one or more turbocharger rotational speed sensors, one or more accelerator pedal position sensors, one or more brake pedal position sensors, one or more engine coolant temperature sensors 165, one or more exhaust gas oxygen sensors, one or more exhaust gas recirculation pressure sensors 169, one or more ambient air pressure sensors 171, one or more humidity sensors 173, one or more knock sensors 175 and one or more transmission output shaft speed sensors 177. All such sensors may be conventional in their construction and operation.

The one or more engine speed sensors 145 is/are illustratively positioned and operable to produce one or more engine speed signals from which the processor 102 can determine the rotational speed and angular position of the output shaft 12 of the engine 10 by executing one or more conventional sets of instructions stored in the memory 102. The one or more vehicle speed sensors 147 is/are illustratively positioned and operable to produce one or more vehicle speed signals from which the processor 102 can determine the road speed (velocity) of the motor vehicle 140 carrying the engine 10 (and the remaining componentry illustrated in FIG. 1A) by executing one or more conventional sets of instructions stored in the memory 102. The one or more boost pressure sensors 149 is/are illustratively positioned within, or fluidly coupled to, one or more of the intake manifold 18 and/or air intake conduits 22, 24, 58, 62 80, and is/are operable to produce one or more boost pressure signals from which the processor 102 can determine the corresponding pressure(s) within the intake manifold 18 and/or any one or more of the air intake conduits 22, 24, 58, 62 80 by executing one or more conventional sets of instructions stored in the memory 102.

The one or more intake manifold temperature sensors 151 is/are illustratively positioned within, or fluidly coupled to, the intake manifold 18 (and/or in one or more of the air intake conduits 22, 24, 58, 62 80), and is/are operable to produce one or more temperature signals from which the processor 102 can determine the temperature within the intake manifold 18 (and/or in any one or more of the air intake conduits 22, 24, 58, 62 80) by executing one or more conventional sets of instructions stored in the memory 102. The one or more intake mass air flow sensors 153 is/are illustratively positioned within, or fluidly coupled to, the intake manifold 18 (and/or in one or more of the air intake conduits 22, 24, 58, 62 80), and is/are operable to produce one or more air flow signals from which the processor 102 can determine the flow rate of air within the intake manifold 18 (and/or within any one or more of the air intake conduits 22, 24, 58, 62 80) by executing one or more conventional sets of instructions stored in the memory 102. The one or more ambient temperature sensors 155 is/are illustratively positioned external to the engine 10 and the air handling system, and is/are operable to produce one or more temperature signals from which the processor 102 can determine the temperature of ambient air outside of the engine 10 and air handling system by executing one or more conventional sets of instructions stored in the memory 102.

The one or more aftertreatment device temperatures sensors 157 is/are illustratively positioned within, or fluidly coupled to, any of the one or more exhaust gas aftertreatment devices 42, 44, 76, 86 (and/or one or more of the exhaust gas conduits 40, 44, 48, 74, 78, 84), and is/are operable to produce one or more temperature signals from which the processor 102 can determine the temperature of exhaust gas entering, exiting and/or within any of the one or more exhaust gas aftertreatment devices 42, 44, 76, 86 by executing one or more conventional sets of instructions stored in the memory 102. The one or more turbocharger rotational speed sensors 159 is/are illustratively positioned on and/or proximate to the rotatable shaft(s) 30, 68 of the turbocharger(s) 28, 66, and is/are operable to produce one or more turbocharger speed signals from which the processor 102 can determine the rotational speed of the rotatable shaft(s) 30, 68 of the turbocharger(s) 28, 66 by executing one or more conventional sets of instructions stored in the memory 102.

The one or more accelerator pedal position sensor(s) 108 is/are illustratively positioned on and/or proximate to an accelerator pedal 92 carried by the motor vehicle 140 (see FIG. 1A), and is/are operable to produce one or more position signals from which the processor 102 can determine the position of the accelerator pedal 92 relative to a reference position of the accelerator pedal 92 and/or determine a rate of change of position of the accelerator pedal 92, and in some embodiments determine therefrom a requested or demanded engine output torque ("requested torque") or requested or demanded fueling rate and/or quantity ("requested fueling"), by executing one or more conventional sets of instructions stored in the memory 102. The one or more brake pedal position sensor(s) 110 is/are illustratively positioned on and/or proximate to a brake pedal 94 carried by the motor vehicle 140 (see FIG. 1A), and is/are operable to produce one or more position signals from which the processor 102 can determine the position of the brake pedal 94 relative to a reference position of the accelerator pedal 92 and/or determine a rate of change of position of the brake pedal 94, and in some embodiments to determine therefrom a demanded vehicle deceleration rate ("vehicle deceleration demand"), by executing one or more conventional sets of instructions stored in the memory 102.

The one or more engine coolant temperature sensors 165 is/are illustratively positioned in or fluidly coupled to a coolant fluid and/or other fluid in the engine 10 and/or coupled to one or more structures of the engine 10, and is/are in any case operable to produce one or more temperature signals from which the processor 102 can determine the operating temperature of the engine 10 by executing one or more conventional sets of instructions stored in the memory 102. The one or more exhaust gas oxygen sensors 167 is/are illustratively positioned within, or fluidly coupled to, any of the exhaust manifold 50, the one or more exhaust gas aftertreatment devices 42, 44, 76, 86 and/or one or more of the exhaust gas conduits 40, 44, 48, 74, 78, 84, and is/are operable to produce one or more oxygen signals from which the processor 102 can determine the oxygen content of exhaust gas exiting the exhaust manifold 50 and/or entering, exiting and/or within any of the one or more exhaust gas aftertreatment devices 42, 44, 76, 86 and/or exhaust gas conduits 40, 44, 48, 74, 78, 84 and, in some embodiments, to use such information to determine the air-to-fuel ratio (A/F or "λ") of air/fuel charge entering the combustion chambers of the cylinder(s) $11_1$-$11_K$, by executing one or more conventional sets of instructions stored in the memory 102.

The one or more exhaust gas recirculation (EGR) pressure sensors 169 is/are illustratively positioned in or fluidly coupled to the EGR conduit 52 across a flow restriction orifice, and is/are operable to produce one or more pressure signals from which the processor 102 can determine the pressure of recirculated exhaust gas in the EGR conduit 52 by executing one or more conventional sets of instructions stored in the memory 102. In some embodiments, two or more such EGR pressure sensors 169 may be positioned on either side of a flow restriction orifice in the EGR conduit 52, e.g., on either side of the EGR valve 54, and in other embodiments a conventional, so-called "ΔP" sensor 169 may be coupled to the EGR conduit 52 across the flow restriction orifice, e.g., across the EGR valve 54, wherein any such sensor arrangement is operable to produce one or more signals from which the processor 102 can determine a pressure differential across the flow restriction orifice. The one or more ambient pressure sensors 171 is/are illustratively positioned external to the engine 10 and the air handling system, and is/are operable to produce one or more pressure signals from which the processor 102 can determine the pressure of ambient air outside of the engine 10 and air handling system, i.e., the barometric or atmospheric pressure of the ambient air, by executing one or more conventional sets of instructions stored in the memory 102.

The one or more humidity sensors 173 is/are illustratively positioned within, or fluidly coupled to, the intake manifold 18 (and/or in one or more of the air intake conduits 22, 24, 58, 62 80), and is/are operable to produce one or more humidity signals from which the processor 102 can determine the relative and/or specific humidity within the intake manifold 18 (and/or in any one or more of the air intake conduits 22, 24, 58, 62 80), and, in some embodiments, to use such information to determine the air-to-fuel ratio (A/F or "λ") of air/fuel charge entering the combustion chambers of the cylinder(s) $11_1$-$11_K$, by executing one or more conventional sets of instructions stored in the memory 102. The one or more knock sensors 175 is/are illustratively positioned within or coupled to the engine 10, and is/are operable to produce one or more knock signals from which the processor 102 can determine and monitor spark knock or detonation by executing one or more conventional sets of instructions stored in the memory 102. In embodiments which include one or more transmission output shaft speed sensors 177 coupled to the ECU 100, one or more such sensors 177 may illustratively be positioned and operable to produce one or more transmission output speed signals from which the processor 102 (and/or a transmission control unit (TCU)) can determine the rotational speed of the output shaft 16 of the transmission 14 by executing one or more conventional sets of instructions stored in the memory 102.

Referring again to FIG. 1A, the ECU 100 is operable to control operation of the engine 10, air handling system (e.g., turbocharger(s) 28 and/or 66, EGR valve 54, and/or air intake throttle 82) and/or electric machine(s) 36, 88 based, at least in part, on the sensory data produced by one or more of the plurality of sensors 96 just described, by controlling one or more actuators associated with the engine 10 and/or air handling system. Some such actuators have been described hereinabove, including one or more fuel injectors 116, one or more spark plugs 118, the EGR valve 54, the electric machine(s) 36, 88, the VGT(s) 32, 70 and the air intake throttle 82, in embodiments which include such components, and all such actuators are electrically coupled to the ECU 100 as illustrated in FIG. 1A. Control of the electric machine(s) 36, 88 is/are illustratively accomplished by controlling current provided to the coils 38, 90 of the electric machine(s) 36, 88. Such current is illustratively supplied to, or extracted from, the coils 38, 90 by a conventional power controller 112 that is electrically coupled to the ECU 100 and to a source 114 of electrical power, e.g., one or more batteries and/or other sources of electrical power, and the memory 104 illustratively has stored therein one or more sets of instructions executable by the processor 102 to control operation of the power controller 112.

In addition to the actuators described hereinabove, the engine 10 may further illustratively include one or more conventional displacement-on-demand (DOD) devices 120 for selectively deactivating and reactivating one or more cylinders $11_1$-$11_K$ during operation of the engine 10, e.g., by selectively disabling and enabling operation of fuel injectors, spark plugs and/or intake and exhaust valves. In the illustrated embodiment, one such DOD device 120 is shown coupled to, or integral with, one of the cylinders $11_1$, although it will be understood that in other embodiments one or more DOD devices 120 may be coupled to, or integral with, multiple cylinders $11_1$-$11_K$.

In the embodiment illustrated in FIG. 1A, the transmission 14 is illustratively an automatic transmission, e.g., having a plurality of selectable gears or continuously variable gear ratio, in which shifting between such gears or varying a continuously variable gear ratio is automatically controlled by a transmission control unit (TCU) 130 (hereinafter referred to generally as "automatic shifting"). Illustratively, the TCU 130 includes at least one conventional processor 132 and at least one memory unit 134 has stored therein a plurality of sets of conventional instructions, e.g., represented by the shift control module 136 illustrated in FIG. 1A, which are executable by the processor 132 to manage and control automatic shifting. The TCU 130 is electrically coupled to the ECU 100 via a communication bus 138, e.g., SAE-J1939 and/or other vehicle bus, and the ECU 100 and TCU 130 are each operable to communicate with each other via the vehicle bus 138 using any conventional vehicle bus communication protocol. Automatic shifting of the transmission 14 is generally controlled by the TCU 130, in accordance with the instructions stored in the shift control module 136, based on information provided to the TCU 130 by sensors on-board the transmission (e.g., transmission output shaft sensor 177 and/or other sensors) and based on engine operating information provided by the ECU 100 via the vehicle bus 138. The TCU 130 is also operable to share operating conditions, e.g., current engaged gear ratio, next gear ratio to be engaged pursuant to an autoshift, etc.) with the ECU 100 via the vehicle bus 138.

In other embodiments, the transmission 14 may be a manual transmission in which a clutch is used during a shift event to allow changing from one gear to another. In still other embodiments, the transmission 14 may be an automatically-shifting manual (ASM) which could be a dual-clutch type or any other suitable type of manual transmission in which TCU 130 manages shift events in cooperation with the ECU 100. In embodiments in which the transmission 14 is an ASM, a paddle shifter (not shown) may be coupled thereto. In embodiments in which the transmission 14 is a completely manual transmission, a conventional gear shift selector (not shown) may be coupled thereto, and in such cases the TCU 130 may be omitted and one or more signals indicative of position and/or operation such a gear shift selector may be provided directly to the ECU 100 for controlling, at least in part, operation of the engine 10 during manual shifting events.

In the illustrated embodiment, the engine 10, transmission 14, air handling system, ECU 100, TCU 130 and all other components illustrated in FIG. 1A, are all carried by a motor vehicle 140 which may be or include a road vehicle such as an automotive vehicle, truck, bus or the like, an off-road vehicle such as an industrial (e.g., heavy equipment for construction and/or earthwork operations, etc.), motorsports or recreational vehicle, a marine vehicle, or the like. In some alternative embodiments, the engine 10, air handling system, including either or both ECTs 28, 66, ECU 100, sensors 96 and all associated, ancillary components form part of an electrical generator, and in such embodiments the electrical generator is represented by item 140. In such embodiments, however, it will be understood that some such components may be mounted off board of, and in some cases remote from, the electrical generator 140.

Figure 1C:
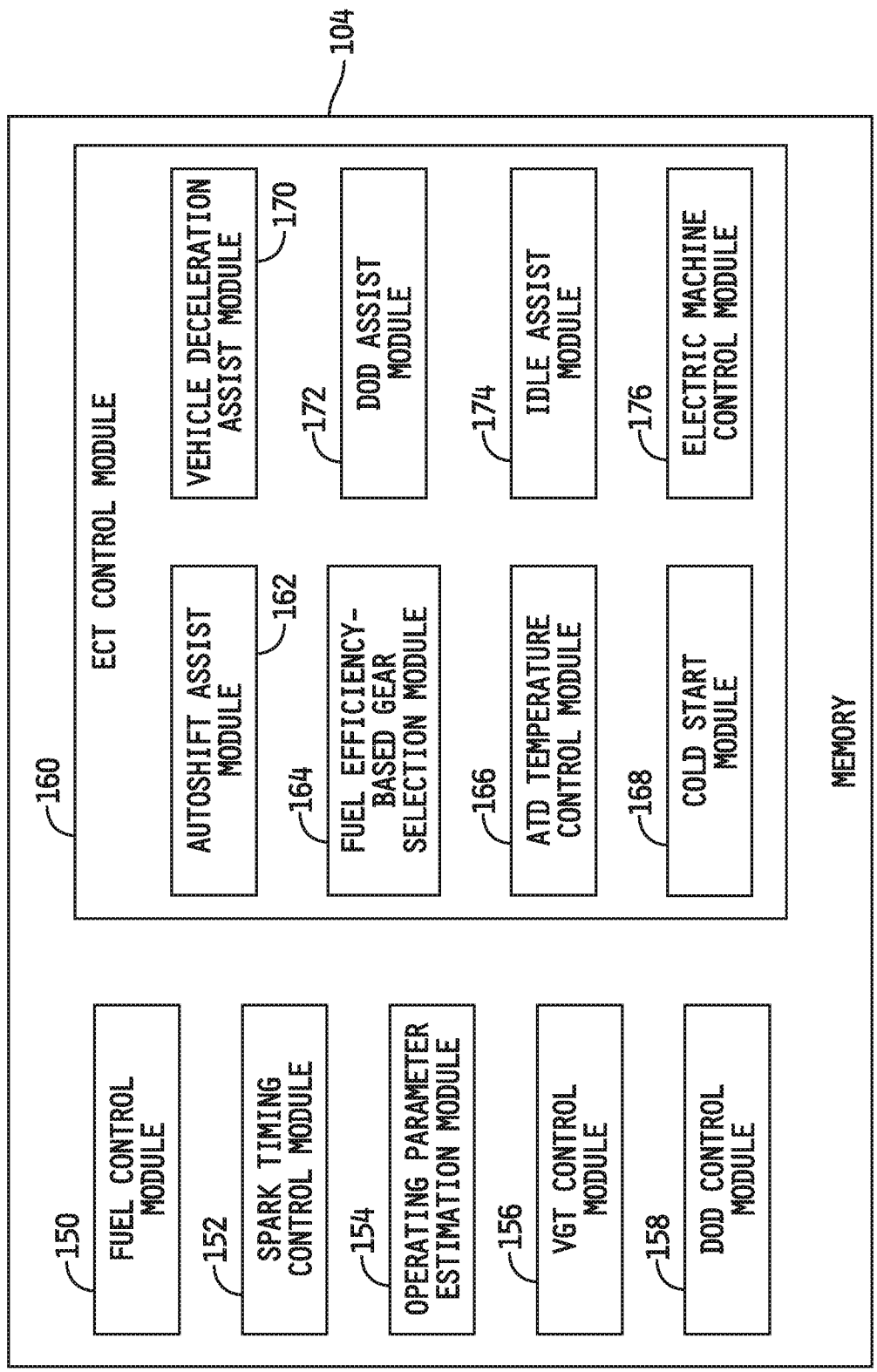
FIG. 1C is a simplified block diagram showing some example application modules stored in the memory of the ECU illustrated in FIG. 1A.

Referring now to FIG. 1C, a simplified block diagram is shown illustrating some example application modules stored in the memory 104 of the ECU 100 illustrated in FIG. 1A. Each application module illustratively has stored therein one or more sets of instructions executable by the processor 102 of the ECU 100 to perform one or more particular functions. For example, the memory 104 illustratively includes a conventional fuel control module 150 having one or more sets of instructions stored therein executable by the processor 102 to control operation of the fuel injector(s) 116 (and/or of a larger fuel system of which the fuel injector(s) 116 is/are a part). The memory 104 further illustratively includes a conventional spark timing control module 152 having one or more sets of instructions stored therein executable by the processor 102 to control operation, e.g., spark timing and/or duration, of the spark plug(s) 118 in embodiments which include spark plug(s) 118.

The memory 104 further illustratively includes a conventional operating parameter estimation module 154 having one or more sets of instructions stored therein executable by the processor 102 to estimate one or more operating parameters of the engine 10 and/or air handling system based, at least in part, on information provided by one or more of the physical sensors 96. Examples of operating parameters estimated by the processor 102 in accordance with such one or more "virtual sensor" processes stored in the operating parameter estimation module 154 may include, but are not limited to, engine output torque, engine load, operating temperature of either or both of the compressors 26, 64, operating temperature of either or both of the turbines 32, 70, EGR flow rate, EGR percentage in the air/fuel charge, EGR temperature, in-cylinder temperature(s), combustion temperature(s), the temperature of exhaust gas produced by the engine 10, fuel consumption, volumetric efficiency, combustion efficiency, and the like. Alternatively or additionally, one or more of the virtual sensor processes stored in the operating parameter estimation module 154 and executed by the processor 102 may be used in place of, or in addition to, information provided by one or more of the sensors 96 described hereinabove.

The memory 104 further illustratively includes a conventional VGT control module 156, in embodiments in which the turbine 32 and/or the turbine 70 is a variable geometry turbine, having one or more sets of instructions stored therein executable by the processor 102 to selectively control the position of the VGT actuator(s) 122, 124. The memory 104 further illustratively includes a conventional DOD control module 158, in embodiments which include one or more displacement-on-demand actuators 120, having one or more sets of instructions stored therein which are executable by the processor 102 to selectively control an operating state, e.g., deactivated, reactivate or inactive.

The memory 104 further illustratively has stored therein an ECT control module 160 including any number of different control modules each having stored therein one or more sets of instructions executable by the processor 102 of the ECU 100 to perform one or more particular control strategies, wherein all such control strategies include controlling at least the ECT 28 and/or the ECT 66. In the illustrated embodiment, for example, the ECT control module 160 may include, but not limited to, any one or more of an autoshift assist module 162, a fuel efficiency-based gear selection module 164, an aftertreatment device (ATD) temperature control module 166, a cold start module 168, a vehicle deceleration assist module 170, a displacement-on-demand (DOD) assist module 172, an idle assist module 174 and an electric machine control module 176. It will be understood that the ECT control module 160 may include one or any combination of the illustrated control modules. Alternatively, the ECT control module 160 may include all or some of the illustrated control modules, and the processor 102 may be programmed to execute only one or a subset of the included control modules. Example processes for carrying out the control strategies embodied in each of the illustrated control modules 162-176 will be described in detail below with reference to FIGS. 2-14. In the following description, all references to controlling a motor/generator will be understood to mean controlling either or both of the electric machines 36, 88 in embodiments which include both turbochargers 28, 66, and to mean controlling one of the electric machines 36, 88 in embodiments which include only one of the turbochargers 28, 66.

Figure 2:
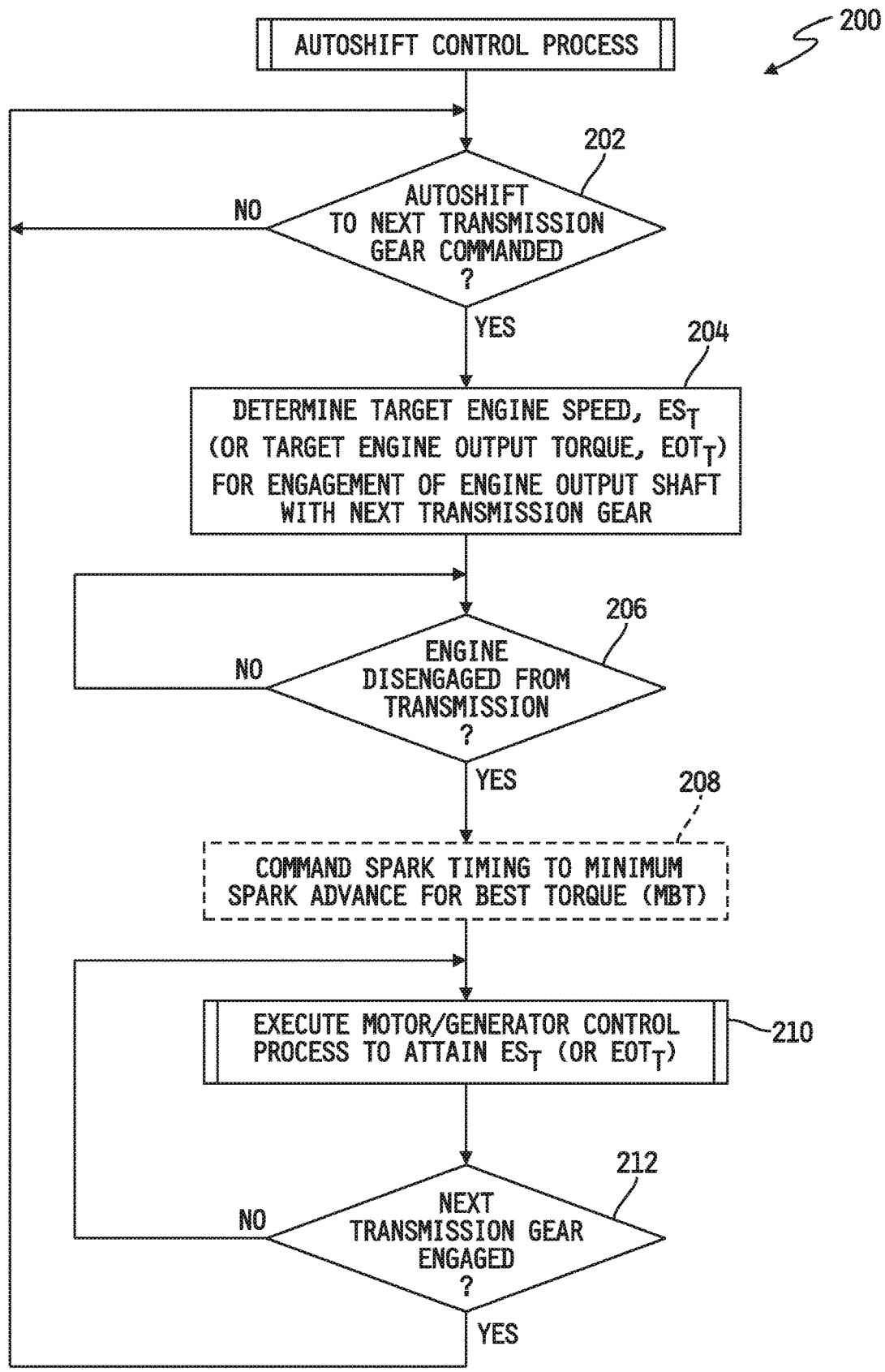
FIG. 2 is a simplified flow diagram of an embodiment of a Autoshift Control Process for controlling engine output during autoshifting of the transmission illustrated in FIG. 1A.

Referring now to FIG. 2, a simplified flow diagram is shown of an embodiment of an Autoshift Control Process 200 for controlling engine output during autoshifting of the transmission 14 illustrated in FIG. 1A. The process 200 is illustratively stored in the autoshift assist module 162 of the memory 104 in the form of instructions executable by the processor 102 of the ECU 100. The illustrated process 200 begins at step 202 where the processor 102 is operable to determine whether an autoshift the next gear of the transmission 14 has been commanded. In some embodiments, the TCU 130 is operable to control and command such autoshifting of the transmission 14 in a conventional manner as described above, and in such embodiments the processor 102 of the ECU 100 is operable to execute step 202 by receiving and processing one or more shift notification messages or other indicator(s) broadcast or otherwise transmitted by the TCU 130 to the ECU via the vehicle bus 138, and determining from such one or more shift notification messages that an autoshift to a next transmission gear has been commanded by the TCU 130. In some embodiments, the one or more shift notification messages may further include an identification of the next gear to be engaged as part of the autoshift event, and/or may include information relating to the gear ratio of the next gear to be engaged and/or the rotational speed of the output shaft 16 (and/or input shaft) of the transmission 14. In other embodiments, the processor 102 may be operable to determine the next gear, e.g., in embodiments which do not include a TCU 130. In any case, the process 200 advances from step 202 to step 204 where the processor 102 is operable to determine a target engine speed, $ES_T$, or a target engine output torque, $EOT_T$, for engagement of the engine output shaft 12 with the next gear of the transmission 14 to be engaged. The processor 102 is illustratively operable to determine $ES_T$ or $EOT_T$ in a conventional manner based on information provided by the TCU 130 and and/or based on gear ratio and/or other operating information about the transmission 14 stored in the data storage 106 or memory 104.

Following step 204, the processor 102 is operable at step 206 to determine whether the engine 10 is disengaged from the transmission 14. In embodiments in which the transmission 14 is controlled by the TCU 130, the TCU 130 is operable to broadcast or otherwise transmit such information to the ECU 100 via the vehicle bus 138, and in such embodiments the processor 102 of the ECU 100 is thus operable to execute step 206 by receiving and processing such gear disengagement information provided by the TCU 130 to determine whether and when gear disengagement has occurred. In embodiments which do not include the TCU 130, the processor 102 is illustratively operable to execute step 206 based on stored gear ratio information and on a comparison between engine speed and the speed of the output shaft 16 of the transmission 14. In any case, until such gear disengagement occurs, the process 200 illustratively loops back to the beginning of step 206.

When gear disengagement has been detected by the processor 102, the processor illustratively advances to step 210 where the processor 102 is operable to execute a motor/generator control process to attain the target engine speed $ES_T$ or target engine output torque, $EOT_T$. In some embodiments, the process 200 may further include a step 208 executed by the processor 102 prior to step 210 (or executed after step 210) in which the processor 102 is operable to control or command spark timing, e.g., via one or more control strategies stored in the spark timing control module 152, to minimum advance for best torque (MBT). MBT, which is sometimes alternatively referred to as spark timing for maximum brake torque, is generally understood to for a particular engine 10 to be the spark or ignition timing for a given air-to-fuel ratio that yields maximum engine output power (or torque) and efficiency. In any case, following execution of step 210, the process 200 advances to step 212 where the processor 102 determines whether engagement of the output shaft 16 of the engine with the next transmission gear has occurred. If not, the process 200 loops back to step 210 and otherwise the process 200 loops back to the beginning of step 202.

Figure 3:
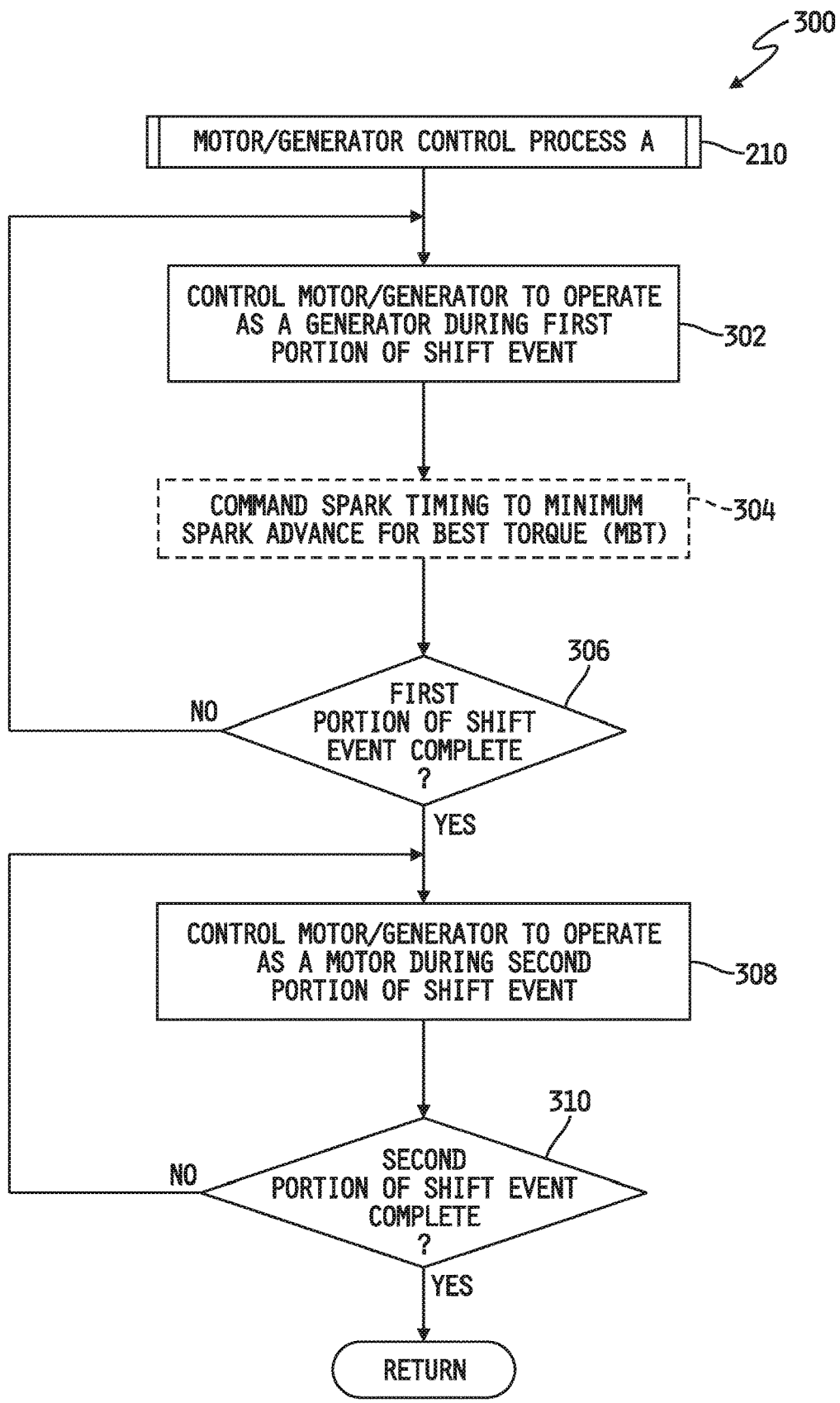
FIG. 3 is a simplified flow diagram of an embodiment of the Motor/Generator Control Process executed by the process illustrated in FIG. 2.

Referring now to FIG. 3, a simplified flow diagram is shown of an embodiment of a Motor/Generator Control Process 300 executed at step 210 of the process 200 illustrated in FIG. 2. The process 300 is illustratively stored in the electric machine control module 176 of the memory 104 in the form of instructions executable by the processor 102 of the ECU 100. The illustrated process 300 begins at step 302 where the processor 102 is operable to control the motor/generator 36 and/or 88 to operate as a generator during a first portion, e.g., duration, of the shift event.

During a shift, the engine 10 is initially disengaged from the transmission 14 as described at step 206 of the process 200. During such disengagement, there may be significantly reduced load on the engine and, if no mitigating measures are taken, engine speed may flare under some shift scenarios. The processor 102 is illustratively operable to execute step 302 to control the motor/generator 36 and/or 88 to operate as a generator by controlling or commanding the power controller 112 to extract energy, e.g., electrical current, from the coils 38 of the motor/generator 36 and/or from the coils 90 of the motor/generator 88. Extraction of electrical power from the coils 38 and/or 90 causes the motor/generator 36 and/or 88 to operate as a generator during which the motor/generator 36 and/or 88 applies a retarding force to the turbocharger shaft 30 and/or 68 thereby reducing the rotational speed thereof. With reduced rotational speed, the boost of the turbocharger 28 and/or 66 is likewise reduced, as is the backpressure of exhaust gas acting on the turbine 32 and/or 70. As a result, the engine speed and/or engine output torque is reduced, thereby controlling engine speed flare during the first portion of the shift event following disengagement of the transmission 14 from the engine 10. At step 302, the ECT 28 and/or 66 is thus controlled to manage any such speed flare (or alternatively to achieve the target engine output torque, $EOT_T$) during a least the first portion of the shift event.

Following step 302, the processor 102 is illustratively operable at step 306 to determine whether the first portion of the shift event is complete. In some embodiments, the processor 102 is operable to execute step 306 by determining whether a predefined time period has elapsed since gear disengagement was detected at step 206 of the process 200. In some embodiments, the predefined time period may be different for two or more gears of the transmission 14, and/or may be different for one or more upshifts than for one or more downshifts. If, at step 306, the processor 102 determines that the first portion of the shift event is complete, the process 300 advances to step 308, and otherwise the process 300 loops back to the beginning of step 302.

In some embodiments in which step 208 of the process 200 is omitted, an identical such step 304 may be optionally included in the process 300 following step 302 as illustrated in FIG. 3 or prior to step 302. It is generally known to manage engine speed flare during autoshift events by retarding spark or ignition timing. By controlling the motor/generator 36 and/or 88 to operate as a generator in at least a first portion of the shift event following disengagement of the transmission 14 from the engine 10, however, spark or ignition timing need not be retarded as the control of engine speed flare is managed by the motor/generator 36 and/or 88. Accordingly, step 302 may thus be included to advance spark or ignition timing to MBT during the first portion of the shift event following gear disengagement.

At step 308, the processor 102 is illustratively operable to control the motor/generator 36 and/or 88 to operate as a motor during a second portion of the shift event that follows completion of the first portion of the shift even. In order for engagement of the next transmission gear to occur, the rotational speeds of the output shaft 16 of the engine 10 and the input shaft of the transmission 14 must be synchronous to allow meshing and engagement of gear teeth coupled to each such shaft. Moreover, upon re-engagement of the engine 10 and transmission 14 as part of the shift event, the engine speed and/or torque can drop as the engine is once again loaded. In order to ensure such synchronous engagement of gear teeth and/or to mitigate a possible drop in engine speed and/or torque under increased engine load following gear engagement, the processor 102 is illustratively operable to execute step 308 to control the motor/generator 36 and/or 88 to operate as a motor by controlling or commanding the power controller 112 to apply energy, e.g., electrical current, from the power source 114 to the coils 38 of the motor/generator 36 and/or to the coils 90 of the motor/generator 88. The supply of electrical power to the coils 38 and/or 90 causes the motor/generator 36 and/or 88 to apply a rotational drive force to the turbocharger shaft 30 and/or 68 thereby increasing the rotational speed thereof. With increased rotational speed, boost produced by the turbocharger 28 and/or 66 is likewise increased, as is the backpressure of exhaust gas acting on the turbine 32 and/or 70. As a result, the engine speed and/or engine output torque is increased, thereby ensuring synchronous engagement of gear teeth and/or mitigating any possible drop in engine speed and/or torque under increased engine load following gear engagement. At step 308, the ECT 28 and/or 66 is thus controlled to manage engine speed (or to achieve and/or maintain the target engine output torque, $EOT_T$, i.e., such that the target engine output torque, $EOT_T$, is attained throughout the shift event) during a second portion of the shift event when the engine 10 and transmission 14 are being engaged.

Following step 308, the process 300 advances to step 310 where the processor 102 is operable to determine whether the second portion of the shift event is complete. In some embodiments, the processor 102 is operable to execute step 310 by determining whether a predefined time period has elapsed since the first portion of the gear shift event expired. In other embodiments, the processor 102 may be operable to execute step 310 by receiving and processing one or more messages or other indicators broadcast or transmitted by the TCU 130 via the vehicle bus 138 identifying completion of the shift event. In any case, if and when the processor 102 determines at step 310 that the second portion of the shift event is complete, the process 300 is returned to step 210 of the process 200 illustrated in FIG. 2, and otherwise the process 300 loops back to the beginning of step 308.

Figure 4:
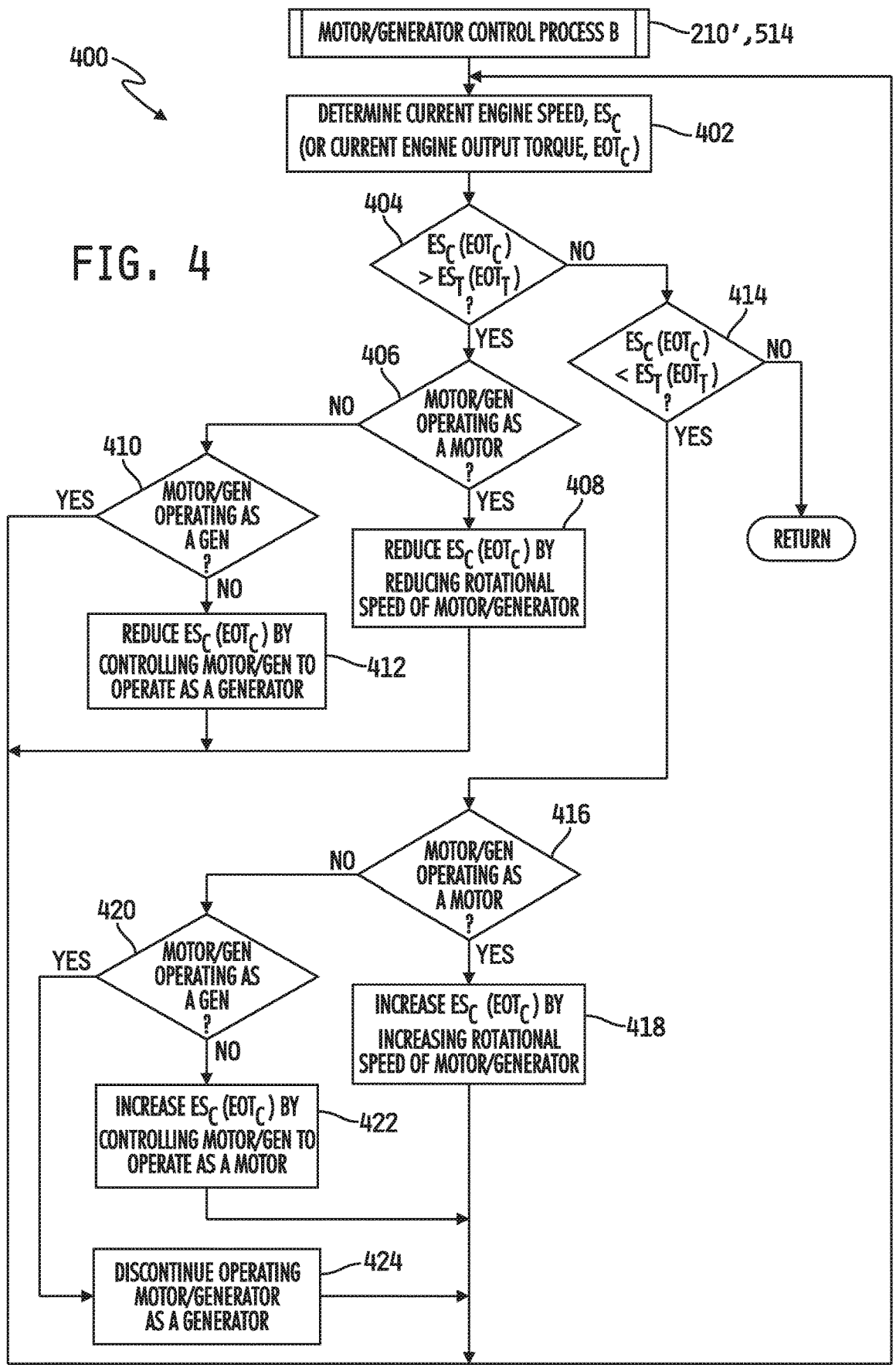
FIG. 4 is a simplified flow diagram of an embodiment of an alternate Motor/Generator Control Process which may be executed by the process illustrated in FIG. 2.

Referring now to FIG. 4, a simplified flow diagram of an alternate embodiment of an alternate Motor/Generator Control Process 400 which may be executed at step 210 of the process 200 illustrated in FIG. 2. The process 400 is illustratively stored in the electric machine control module 176 of the memory 104 in the form of instructions executable by the processor 102 of the ECU 100.

The process 400 illustratively provides for smooth transitioning of engine speed and/or engine output torque during and throughout a shift event via control of the motor/generator 36 and/or 88 to operate under some conditions as a motor and under other conditions as a generator. The illustrated process 400 begins at step 402 where the processor 102 is operable to determine a current value of engine speed, $ES_C$ or a current value of engine output torque, $EOT_C$. In some embodiments, the processor 102 is operable to execute step 402 by monitoring and processing one or more signals produced by the engine speed sensor 145 to determine $ES_C$. In other embodiments, the processor 102 may be operable to execute step 402 by estimating a current value of engine output torque, $EOT_C$, e.g., using a process stored in the operating parameter estimation module 154 to estimate $EOT_C$ based on one or more measured engine operating parameters, e.g., based a currently commanded fueling rate, $ES_C$ and/or other operating parameters.

Following step 402, the process 400 advances to step 404 where the processor 102 is operable to determine whether $ES_C > ES_T$, where $ES_T$ is the target engine speed determined at step 204 of the process 200 illustrated in FIG. 2. Alternatively, the processor 102 may be operable at step 404 to determine whether $EOT_C > EOT_T$, where $EOT_T$ is the target engine output torque determined at step 204 of the process 200. If the processor 102 determines at step 404 that $ES_C > ES_T$ (or that $EOT_C > EOT_T$), the process 400 advances to step 406 where the processor 102 is operable to determine whether the motor/generator 36 and/or 88 is currently operating as a motor. If so, the process 400 advances to step 408 where the processor 102 is operable to control the motor/generator 36 and/or 88 to reduce $ES_C$ (or to reduce $EOT_C$) by reducing the drive force applied by the motor/generator 36 and/or 88 to the turbocharger shaft 30, 68. Illustratively, the processor 102 is operable to execute step 408 by controlling or commanding the power controller 112 to reduce the current applied thereby to the coils 38 and/or 90 of the motor/generator 36 and/or 88. Thereafter the process 400 loops back to step 402.

If, at step 406, the processor 102 determines that the motor/generator 36 and/or 88 is not operating as a motor, the process 400 advances to step 410 where the processor 102 is operable to determine whether the motor/generator 36 and/or 88 is operating as a generator. If so, the motor/generator 36 and/or 88 continues to operate as a generator and the process 400 loops back to step 402. If, however, the processor 102 determines at step 410 that the motor/generator 36 and/or 88 is not operating as a generator, then the motor/generator 36 and/or 88 is currently inactive (and not applying either a retarding force or a drive force to the turbocharger shaft 30 and/or 68), and the process 400 advances to step 412 where the processor 102 is operable to reduce $ES_C$ (or to reduce $EOT_C$) by controlling the motor/generator 36 and/or 88 to operate as a generator. Illustratively, the processor 102 is operable to execute step 412 by controlling or commanding the power controller 112 to extract current from the coils 38 and/or 90 of the motor/generator 36 and/or 88 as described above. Thereafter the process 400 loops back to step 402.

If, at step 404, the processor 102 determines that $ES_C$ is not greater than $ES_T$ (or that $EOT_C$ is not greater than $EOT_T$), the process 400 advances to step 414 where the processor 102 is illustratively operable to determine whether $ES_C < ES_T$. Alternatively, the processor 102 may be operable at step 414 to determine whether $EOT_C < EOT_T$. If not, then $ES_C = ES_T$ (or $EOT_C = EOT_T$) and the process 400 is returned to step 210 of the process 200 illustrated in FIG. 2. If, however, the processor 102 determines at step 414 that $ES_C < ES_T$ (or $EOT_C < EOT_T$), the process 400 advances to step 416 where the processor 102 is operable to determine whether the motor/generator 36 and/or 88 is currently operating as a motor. If so, the process 400 advances to step 418 where the processor 102 is operable to control the motor/generator 36 and/or 88 to increase $ES_C$ (or to increase $EOT_C$) by increasing the drive force applied by the motor/generator 36 and/or 88 to the turbocharger shaft 30, 68. Illustratively, the processor 102 is operable to execute step 418 by controlling or commanding the power controller 112 to increase the current applied thereby to the coils 38 and/or 90 of the motor/generator 36 and/or 88. Thereafter the process 400 loops back to step 402.

If, at step 416, the processor 102 determines that the motor/generator 36 and/or 88 is not currently operating as a motor, the process 400 advances to step 420 where the processor 102 is operable to determine whether the motor/generator 36 and/or 88 is operating as a generator. If not, the process 400 advances to step 422 where the processor 102 is operable to increase $ES_C$ (or to increase $EOT_C$) by controlling the motor/generator 36 and/or 88 to operate as a motor. Illustratively, the processor 102 is operable to execute step 422 by controlling or commanding the power controller 112 to supply current to the coils 38 and/or 90 of the motor/generator 36 and/or 88 as described above. Thereafter the process 400 loops back to step 402.

If, at step 420, the processor 102 determines that the motor/generator 36 and/or 88 is currently operating as a motor, the process 400 advances to step 424 where the processor 102 is operable to discontinue operating the motor/generator 36 and/or 88 as a generator to thereby cease applying a retarding force to the turbocharger shaft 30 and/or 68. Thereafter the process 400 loops back to step 402.

Figure 5:
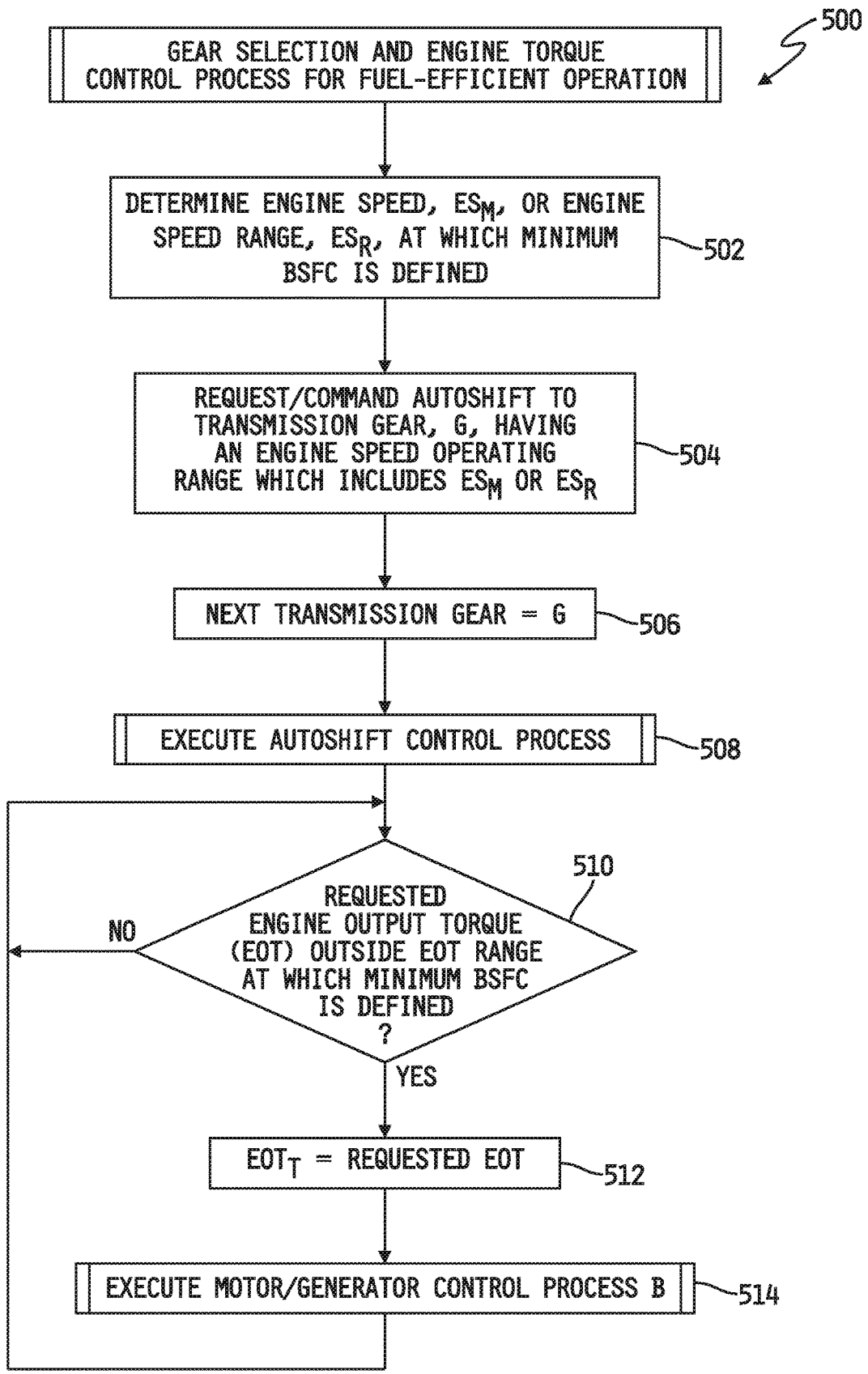
FIG. 5 is a simplified flow diagram of an embodiment of a Gear Selection Control Process for controlling autoshifting of the transmission illustrated in FIG. 1A to achieve fuel-efficient operation of the engine illustrated in FIG. 1A.

Referring now to FIG. 5, a simplified flow diagram is shown of an embodiment of a Gear Selection Control Process 500 for controlling autoshifting of the transmission 14 to achieve fuel-efficient operation of the engine 10. The process 500 is illustratively stored in the fuel efficiency-based gear selection module 164 of the memory 104 in the form of instructions executable by the processor 102 of the ECU 100. Because of the wide range of selectable variability in engine speed and/or engine output torque that is available via control of the ECTs 28 and/or 66 in the system of FIGS. 1A-1C, it is possible to request or command shifting to transmission gears in which the engine 10 operates in more fuel-efficient brake specific fuel consumption (BSFC) regions than would otherwise occur with conventional autoshifting schedules executed by the TCU 130. In conventional systems without an ECT, autoshifting schedules executed by the TCU 130 typically commands and controls engagement of the engine 10 to transmission gears having higher than necessary gear ratios based on current operating conditions so that the engine 10 will be able to quickly provide a higher output torque to the wheels of the vehicle 140 if/when requested. However, such autoshifting schedules tend to select and control engagement to transmission gears at which the engine 10 operates in less than optimally efficient BSFC zones or regions. With the ECT 28 and/or 66 available with the engine 10 as illustrated in FIG. 1A, very rapid increases in engine torque can be realized via control of the motor/generator 36 and/or 88. This, then, allows for the selection of, and engagement to, gears of the transmission 14 at which the operation of the engine 10 is more fuel efficient, i.e., at which the engine operates in lower BSFC zones or regions and, ultimately, in or near the lowest BSFC zone, region or point. The process 500 illustrated in FIG. 5 represents an example of such a process.

Figure 6:
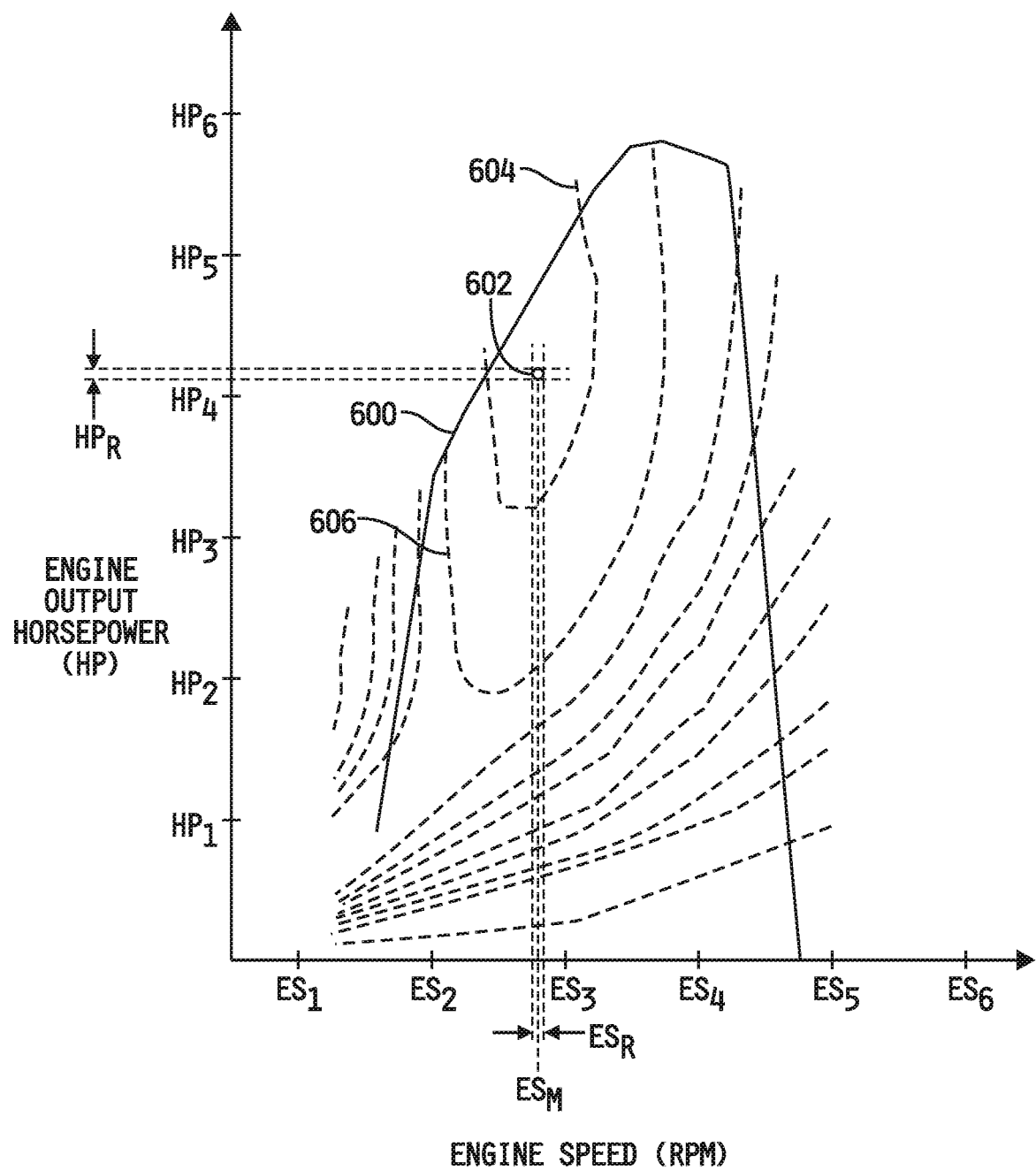
FIG. 6 is a plot of engine horsepower vs. engine speed with a number of brake specific fuel consumption curves superimposed thereon for graphically demonstrating operation of the process illustrated in FIG. 5.

The process 500 illustrated in FIG. 5 begins at step 502 where the processor 102 is operable, in one embodiment, to determine an engine speed, $ES_M$, or engine speed range, $ES_R$, at which the minimum BSFC is defined. In alternative embodiments, $ES_M$ or $ES_R$ may be selected such that the corresponding BSFC zone or region is not the minimum BSFC zone, region or point, but rather a BSFC zone or region which is a more fuel-efficient BSFC zone or region than that in which the engine 10 is currently operating. Referring to FIG. 6, for example, a plot 600 is shown of engine horsepower vs. engine speed (engine horsepower=engine output torque×engine speed/K, where K is a constant), upon which is superimposed a number of contours each representing lines of constant brake specific fuel consumption (BSFC). The point or region 602 illustratively represents the minimum BSFC point or region, i.e., the point at which operation of the engine 10 is the most fuel-efficient and which therefore represents the most fuel economic operation of the engine 10. The BSFC contours surrounding the minimum BSFC point or region 602 define islands, zones or regions of increasing BSFC values, such that the BSFC island defined between the minimum BSFC zone or point 602 and the BSFC contour 604 represents a region of BSFC values that are greater, i.e., less fuel efficient, than the BSFC value of point or zone 602, and the BSFC island defined between the BSFC contours 604 and 606 represents a region of BSFC values that are greater, i.e., less fuel efficient, than those of the BSFC island defined between the contours 602 and 604.

In embodiments of the process 500 illustrated in FIG. 5 in which the processor 102 is operable at step 502 to determine $ES_M$, the engine speed value $ES_M$ is illustrated in FIG. 6 as the engine speed which bisects the minimum BSFC point or zone 602. In embodiments in which the processor 102 is operable step 502 to determine $ES_R$, the engine speed value $ES_R$ is illustrated in FIG. 6 as the engine speed range $ES_R$ which borders the minimum BSFC point or zone 602. Illustratively, the engine horsepower range at which minimum BSFC is defined, is the horsepower range $HP_R$ illustrated in FIG. 6, where the corresponding engine output torque range is defined as $EOT_R=(K\times HP_R)/ES_R$. In other embodiments in which the processor 102 may be operable at step 502 to determine $ES_R$ as a BSFC zone or region which is a more fuel-efficient BSFC zone or region than that in which the engine 10 is currently operating, $ES_R$ may, for example, be the engine speed range which borders or bounds the BSFC island defined by the BSFC contours 604 and 602 if the engine 10 is currently operating in a region that is outside of this island, i.e., in a region of the plot or map 600 that is outside of the border bounded by the BSFC contour 604.

The process 500 advances from step 502 to step 504 where the processor 102 is operable to request or command an autoshift to a transmission gear, G, having an engine speed operating range which includes $ES_M$, $ES_R$ or some other engine speed range determined at step 502 as described above. Thereafter at step 506, the next transmission gear is identified as the transmission gear, G, and thereafter at step 508 the processor 102 is operable to execute an autoshift control process, e.g., the autoshift control process 200 illustrated in FIG. 2. In some embodiments, the processor 102 is operable to execute steps 504-506 by broadcasting or transmitting the autoshift command or request to the TCU 130 along with the selected gear G, via the vehicle bus 138. In other embodiments, the processor 102 is operable to execute steps 504-506 by broadcasting or transmitting the autoshift command or request to the TCU 130 along with the engine speed value $ES_M$ or engine speed range, $ES_R$, and the processor 132 of the TCU 130 is thereafter operable to select the next transmission gear, G, as one having an engine speed operating range which includes $ES_M$ or $ES_R$. In any case, processor 102 is operable to execute the autoshift control process 200 when the processor 132 of the TCU 100 commands the autoshift to the next transmission gear, G, and thereafter the processor 102 executes the process 200 illustrated and described with respect to FIG. 2 using either of the motor/generator control processes illustrated and described with respect to FIGS. 3 and 4.

Following execution of the autoshift process 200 at step 508, the next gear, G, of the transmission 14 is engaged and the process 500 advances to step 510 where the processor 102 is operable to determine whether the requested engine output torque, EOT, is outside of the engine output torque range at which the minimum BSFC, or other reduced BSFC island, zone or region selected at step 502, is defined. Referring again to FIG. 6, if the engine speed range $ES_R$ was selected at step 502, for example, the processor 102 is operable at step 510 to compare the currently requested engine output torque, EOT, with $EOT_R=(K\times HP_R)/ES_R$. Illustratively, the processor 102 is operable at step 510 to determine the currently requested engine output torque, EOT, by estimating a current value of engine output torque, EOT, e.g., using a process stored in the operating parameter estimation module 154 to estimate EOT based on one or more measured engine operating parameters, e.g., based a currently commanded fueling rate, a current value of engine speed, ES, and/or other operating parameters.

If, at step 510, the processor 102 determines that the requested engine output torque, EOT, is outside of the engine output torque range at which the minimum or other selected BSFC is defined, the process 500 advances to step 512 where the processor 102 is operable to set the target engine operating torque value, $EOT_T$, equal to the current value of the requested engine output torque, EOT, and thereafter at step 514 the processor 102 is illustratively operable to execute the motor/generator control process B illustrated in FIG. 4, where the processor 102 is operable to control the motor/generator 36 and/or 88 to control the current value of engine operating torque to $EOT_T$. Following step 514, and also following the "NO" branch of step 510, the process 500 loops back to the beginning of step 510 to compare the requested engine output torque value to the EOT range at which the minimum or other specified BSFC is defined.

Figure 7:
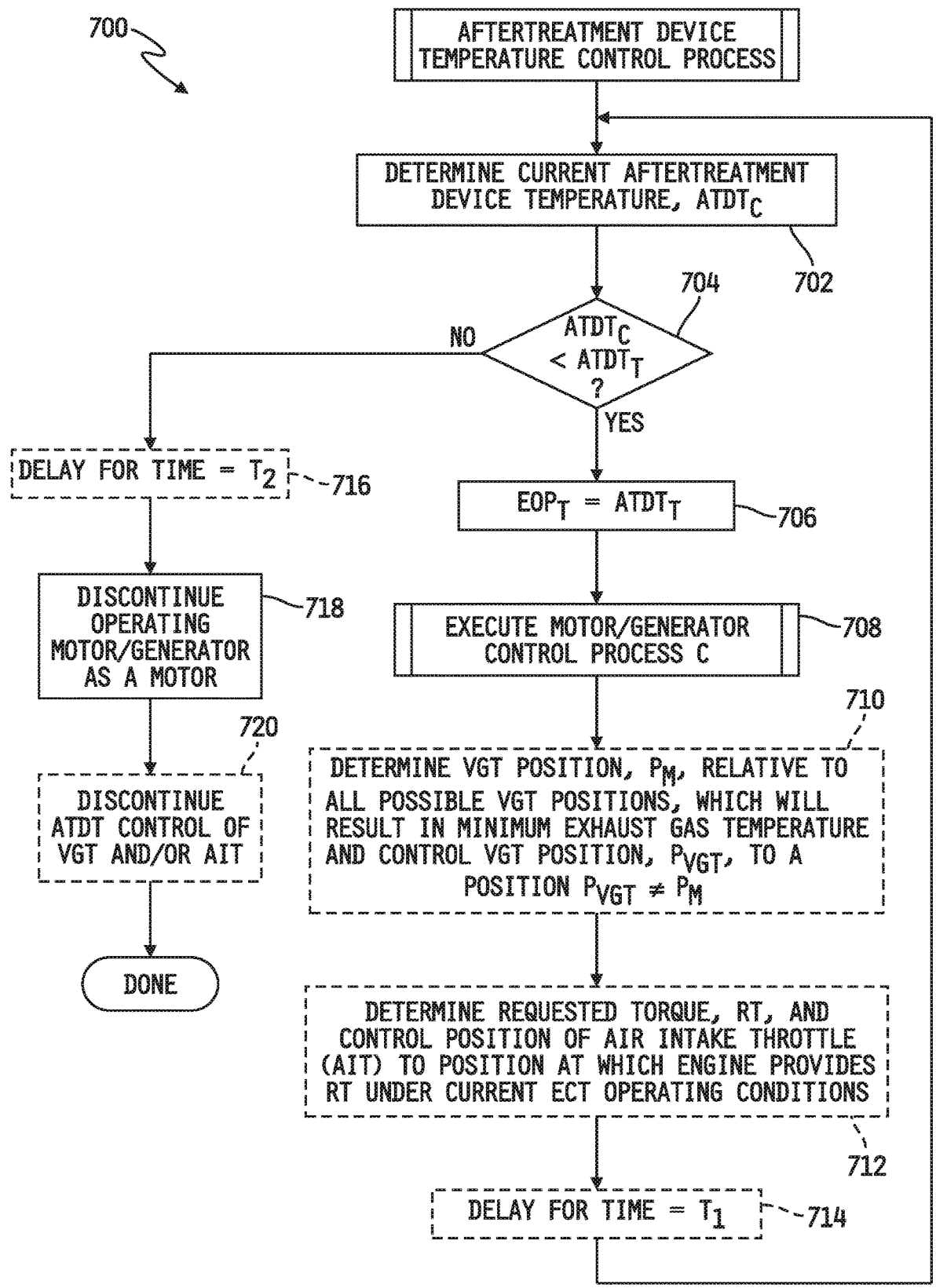
FIG. 7 is a simplified flow diagram of an embodiment of an Aftertreatment Device Temperature Control Process for controlling operation of the engine illustrated in FIG. 1A to achieve a desired temperature of the exhaust gas produced by the engine.

Referring now to FIG. 7, a simplified flow diagram is shown of an embodiment of an aftertreatment device temperature control process 700 for controlling the temperature of exhaust gas produced by the engine 10 in order to achieve a target temperature of one or more of the aftertreatment devices 42, 46, 76, 86. The process 700 is illustratively stored in the aftertreatment device temperature control module 166 of the memory 104 in the form of instructions executable by the processor 102 of the ECU 100. The process 700 begins at step 702 where the processor 102 is operable to determine a current aftertreatment device temperature, $ATDT_C$, i.e., a current operating temperature of one or more of the aftertreatment devices 42, 46, 76, 86. In some embodiments, the processor 102 is operable to execute step 702 by monitoring and processing one or more signals produced by one or more of the aftertreatment device temperature sensors 157 positioned within, in fluid communication with, upstream and/or downstream of the one or more of the aftertreatment devices 42, 46, 76, 86 to determine $ATDT_C$. In other embodiments, the processor 102 may be operable to execute step 702 by estimating a current value of $ATDT_C$ using a process stored in the operating parameter estimation module 154 for estimating $ATDT_C$ based on one or more measured engine operating parameters.

Following step 702, the processor 102 is operable to determine whether $ATDT_C$ determined at step 702 with a target aftertreatment device temperature, $ATDT_T$. In some embodiments, $ATDT_T$ is a regeneration temperature, i.e., a temperature at which one or more of the exhaust gas aftertreatment devices 42, 46, 76, 86 can be purged of contaminants, e.g., soot, particulate matter, NOx, SOx, etc. In other embodiments, $ATDT_T$ may be any desired target temperature. In any case, if the processor 102 determines at step 704 that $ATDT_C < ATDT_T$, the process 700 advances to step 706 where the processor 102 is operable to set a target engine operating parameter value, $EOP_T$, equal to the target aftertreatment device temperature, $ATDT_T$, and thereafter at step 708 the processor 102 is operable to execute a motor/generator control process C.

Figure 8:
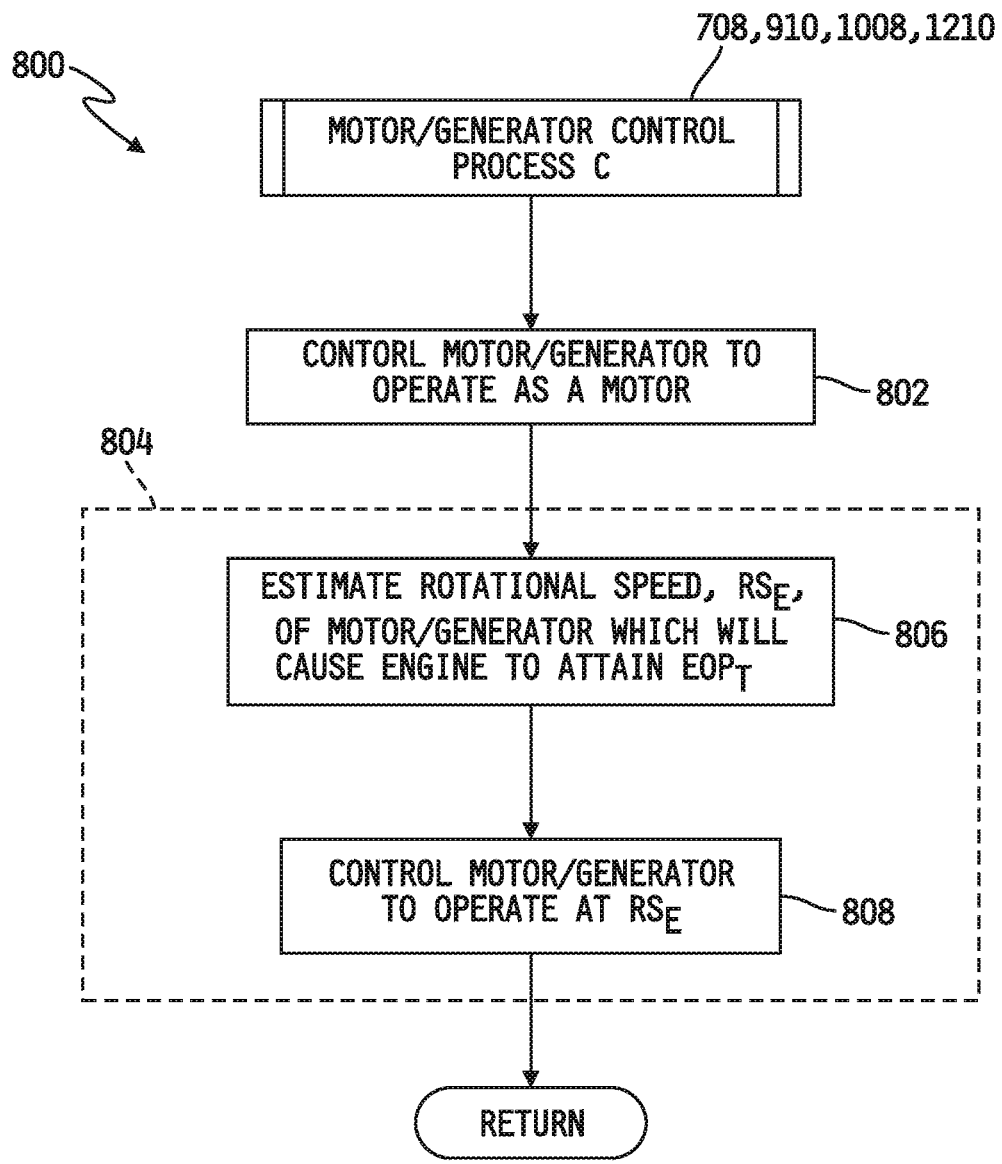
FIG. 8 is a simplified flow diagram of an embodiment of the Motor/Generator Control Process executed by the processes illustrated in FIGS. 7, 9, 10 and 12.

Referring now to FIG. 8, a simplified flow diagram is shown of an embodiment of the motor/generator control process C 800 executed at step 708 of the process 700 illustrated in FIG. 7. The process 800 is illustratively stored in the electric machine control module 176 of the memory 104 in the form of instructions executable by the processor 102 of the ECU 100. The process 800 begins at step 802 where the processor 102 is operable to control the motor/generator 36 and/or 88 to operate as a motor. The processor 102 is illustratively operable to execute step 802 to control the motor/generator 36 and/or 88 to operate as a motor by controlling or commanding the power controller 112 to apply energy, e.g., electrical current, from the power source 114 to the coils 38 of the motor/generator 36 and/or to the coils 90 of the motor/generator 88. The supply of electrical power to the coils 38 and/or 90 causes the motor/generator 36 and/or 88 to apply a rotational drive force to the turbocharger shaft 30 and/or 68 thereby increasing the rotational speed thereof. With increased rotational speed, boost produced by the turbocharger 28 and/or 66 is likewise increased, as is the backpressure of exhaust gas acting on the turbine 32 and/or 70. The engine speed and/or engine output torque is thus increased, and the temperature of the exhaust gas produced by the engine 10 rises as a result of the rotational drive force applied by the motor/generator 36 and/or 88 to the turbocharger shaft 30 and/or 68.

The process 800 may optionally include step 804, and in embodiments of the process 800 which include step 804 the processor 102 is operable at step 806 to estimate the rotational speed, $RS_E$, of the motor/generator 36 and/or 88, i.e., the rotational speed of the turbocharger shaft 30 and/or 68 when driven by the motor/generator 36 and/or 88, which will cause the engine 10 to attain $EOP_T$ which was defined at step 706 to be the target aftertreatment device temperature, $ATDT_T$. In some embodiments, the ATD temperature control module 166 has stored therein one or more maps, tables, graphs, charts, lists and/or other data which maps turbocharger shaft speeds to engine output torque and/or engine speed at various operating conditions, which maps engine output torque and/or engine speed to exhaust gas temperature at various operating conditions, and which maps exhaust gas temperature produced by the engine 10 to exhaust gas temperature at the one or more of the exhaust gas aftertreatment devices 42, 46, 76, 86, and in such embodiments the processor 102 is operable to execute step 806 by determining from such maps the turbocharger shaft speed required to achieve an exhaust gas temperature which will produce $ATDT_T$. In some alternate embodiments, the ATD temperature control module 166 and/or the operating parameter estimation module 154 has stored therein one or more models for estimating $RS_E$ based on current engine and air handling system operating parameters, and in such embodiments the processor 102 is operable to execute step 806 by executing such one or more models using current engine and air handling system parameter values. In any case, optional step 804 advances from step 806 to 808 where the processor 102 is operable to control the motor/generator 36 and/or 88 to operate at $RS_E$, i.e., rotatably drive the turbocharger shaft 30 and/or 68 to rotate at the rotational speed $RS_E$. Following step 808, or following step 802 in embodiments which do not include step 804, the process 800 is returned to step 708 of the process 700.

Referring again to FIG. 7, the process 700 may illustratively include an optional step 710 to which the process 700 advances following step 708. In embodiments which include step 710, the processor 102 is operable to determine a VGT position, $P_M$, relative to all possible VGT positions, which will result in a minimum exhaust gas temperature, and then control the current VGT position, $P_{VGT}$, to a position $P_{VGT}$ ≠ $P_M$. The VGT position $P_M$ is illustratively that which causes the turbine 32 and/or 70 to extract a maximum amount of energy, i.e., heat, from the exhaust gas. Thus, the processor 102 is illustratively operable at step 710 to control the VGT 32 and/or 70 to a position at which the turbine 32 and/or 70 extracts less than the maximum amount of energy from the exhaust gas. Further illustratively, the further from $P_M$ that the position of the VGT 32 and/or 70 is controlled, the more heat the exhaust gas will retain.

The process 700 may alternatively or additionally include another step 712 following step 710 or step 708 in embodiments in which the engine 10 is a gasoline-fueled engine. In embodiments of the process 700 which include step 712 (which embodiments also require the air handling system to include the air intake throttle 82), the processor 102 is operable to determine the current value of requested torque, RT, and to control the position of the air intake throttle 82 to a position at which the engine produces the requested engine output torque, RT, under current operating conditions of the ECT 28 and/or 66. In some embodiments, the processor 102 is operable to determine RT by monitoring and processing one or more signals produced by the accelerator pedal sensor 108 to determine RT. In other embodiments, the processor 102 may be operable to determine RT based on current fueling rate information produced by the fuel control module 150. In any case, the process 700 may further still include an optional step 714 at which the processor 102 is operable to delay for a time period $T_1$, e.g., for the purpose of providing a period of time for $ATDT_C$ to change as a result of the operations undertaken at step 708, step 710 and/or step 712. Following step 708 in embodiments which do not include any of steps 710-714, or from step 714 in embodiments which include step 714, the process 700 loops back to step 702.

If, at step 704, the processor 102 determines that the current aftertreatment device temperature, $ATDT_C$, is not less than the target temperature, $ATDT_T$, the process 700 advances to 718 where the processor 102 is operable to control the motor/generator 36 and/or 88 to discontinue operating as a motor. In some embodiments, the process 700 may further include an optional step 716 prior to step 718 in which the processor 102 is operable to delay for a time period $T_2$, e.g., for the purpose of allowing the aftertreatment device 42, 46, 76 and/or 86 to remain at the target temperature $ATDT_T$ for a desired duration. In some embodiments, $T_2$ may be greater than or equal to the regeneration time of one or more of the aftertreatment devices 42, 46, 76 and/or 86. In other embodiments, $T_2$ may be any desired time period.

The process 700 may further include another optional step 720, which is illustratively included in embodiments which include either of the optional steps 710 and 712. At step 720, the processor 102 is operable to discontinue control of the VGT 32 and/or 70 executed at step 710 and/or to discontinue control of the air intake throttle 82 executed at step 712. Following step 720, or following step 718 in embodiments which do not include step 720, the process 700 terminates.

Figure 9:
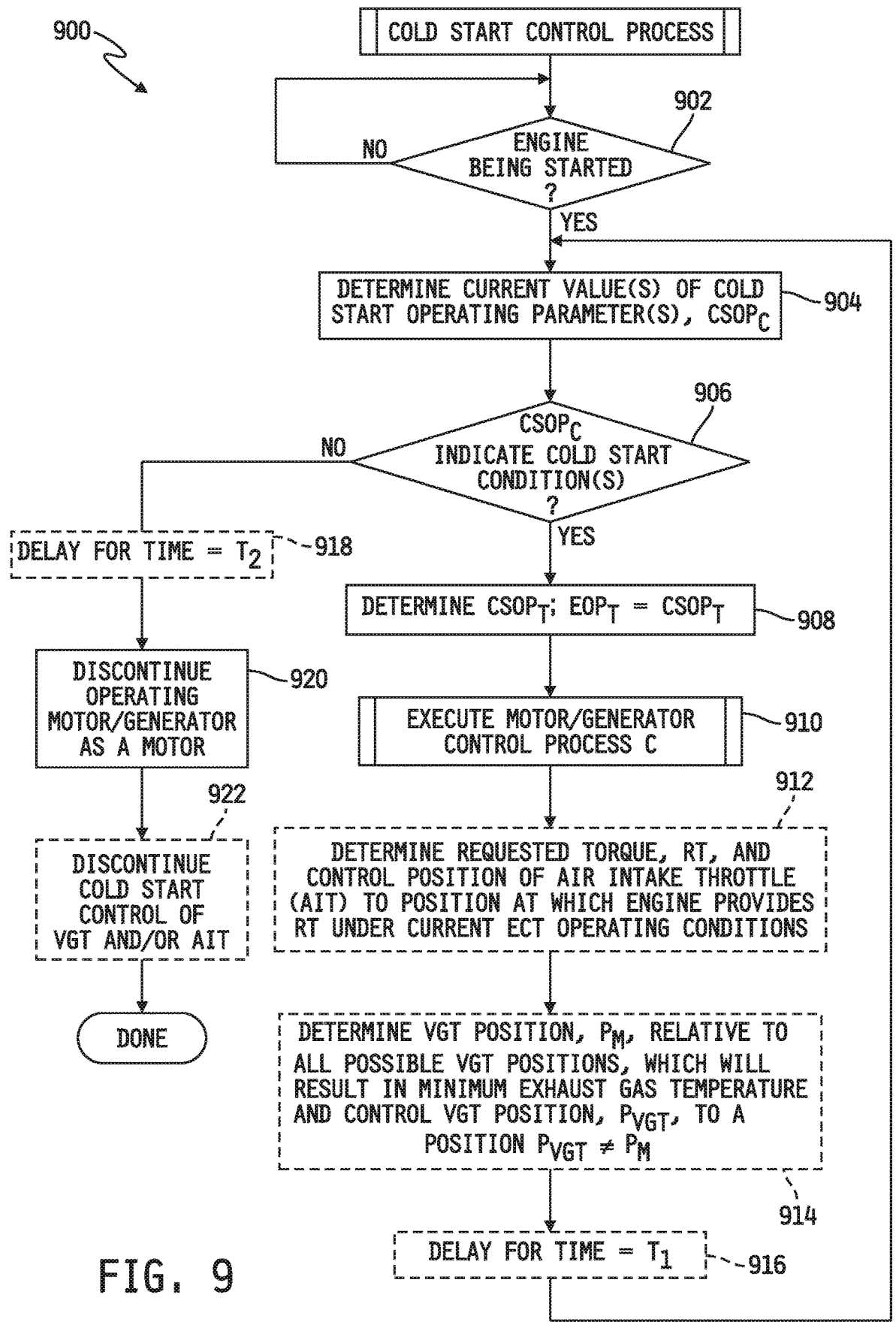
FIG. 9 is a simplified flow diagram of an embodiment of a Cold Start Control Process for controlling operation of the engine illustrated in FIG. 1A during cold start conditions.

Referring now to FIG. 9, a simplified flow diagram is shown of an embodiment of a Cold Start Control Process 900 for controlling operation of the engine 10 during cold start conditions. The process 900 is illustratively stored in the cold start module 168 of the memory 104 in the form of instructions executable by the processor 102 of the ECU 100. The process 900 begins at step 902 where the processor 102 is operable to determine whether the engine 10 is being started, e.g., by monitoring and processing one or more signals produced by the ignition system 98. The processor 102 is illustratively operable to conclude that the engine 10 is being started upon detection of a "crank" signal produced by the ignition system 98, and in some embodiments upon detection of the "crank" signal followed by detection of and "on" signal produced by the ignition system 98. Otherwise, the process 900 loops back to the beginning of step 902 until the processor 102 detects that the engine 10 is being started.

Following step 902, the process 900 advances to step 904 where the processor 102 is operable to determine current values of one or more cold start operating parameters, $CSOP_C$. In some embodiments, $CSOP_C$ may be or include one or any combination of the ambient temperature, e.g., produced by the ambient temperature sensor 155, the intake manifold temperature, e.g., produced by the intake manifold temperature sensor 151, the in-cylinder temperature, e.g., produced by the operating parameter estimation module 154 based on one or more measured operating parameters, engine coolant temperature, e.g., produced by the engine coolant temperature sensor 165, exhaust gas temperature, e.g., produced by the operating parameter estimation module 154 based on one or more measured operating parameters, the operating temperature of one or more of the aftertreatment devices 42, 46, 76, 86, e.g., produced by one or more of the aftertreatment device temperature sensors 157 and ambient humidity, e.g., produced by the humidity sensor 173. Those skilled in the art will recognize other indicators of cold start conditions, and inclusion of any such other indicators at step 904 of the process 900 are contemplated by this disclosure.

Following step 904, the process 900 advances to step 906 where the processor 102 is operable to determine whether the current value(s) of the one or more cold start operating parameters indicate a cold start condition. Illustratively, the processor 102 is operable to execute step 906 by comparing any one or combination of the foregoing temperature and/or humidity signals and/or values with threshold temperature and/or humidity signals and/or values, and concluding a cold start condition if the one or the combination of temperature and/or humidity signals and/or values exceed the threshold temperature and/or humidity signals and/or values. Those skilled in the art will recognize that the one or more threshold temperature and/or humidity signals and/or values may be any temperature(s) and/or relative or specific humidity indicative of a cold ambient environment and/or of cold operation of the engine 10 for which it may be desirable to take measures to increase the operating temperature of the engine 10 in accordance with the process 900.

If, at step 906, the processor 102 determines that $CSOP_C$ indicate(s) a cold start condition, the process 900 advances to step 908 where the processor 102 is operable to determine one or more target cold start operating parameter(s), $CSOP_T$, and to set one or more target engine operating parameter(s), $EOP_T$ equal to $CSOP_T$. Illustratively, the processor 102 is operable to execute step 908 by selecting one or more predetermined $CSOP_T$ values, e.g., from one or more parameter values stored in the memory 104 and/or data storage 106. The one or more $CSOP_T$ value(s) may be or include any one or combination of the cold start operating parameters determined at step 904 or may be or include a different one or subset thereof. As one illustrative example, which should not be considered to be limiting in any way, the processor 102 may be operable to determine $CSOP_C$ at step 904 as a current value of ambient temperature, and may be operable at step 908 to set $EOP_T$ to a target intake manifold temperature value, a target engine coolant temperature value or a target in-cylinder temperature value. Those skilled in the art will recognize other example combinations of one or more $CSOP_C$ parameters and one or more same or different $CSOP_T$ parameters, and any such combination is contemplated by this disclosure.

Following step 908, the processor 102 is operable at step 910 to execute the motor/generator control process C, an example of which is illustrated in FIG. 8 and which was described above in detail. Referring to FIG. 8, in embodiments thereof which include step 804, the processor 102 is operable to estimate, and to control the motor/generator 36 and/or 88 operating as a motor to attain, $CSOP_T$ using any of the one or more techniques described above with respect to step 806. In some embodiments, $RS_E$ may illustratively be a rotational speed of the turbocharger shaft 30 and/or 68 which forces the compressor 26 and/or 64 into a surge condition, i.e., a condition in which the amount of air entering the compressor 26 and/or 64 exceeds the amount of air exiting the compressor 26 and/or 64. This condition causes some of the air within the compressor 26 and/or 64 to be agitated by and within the compressor 26 and/or 64 for some time period before being expelled from the compressor 26 and/or 64, thereby effectively heating such air which will contribute toward rapidly raising the operating temperature of the engine 10.

The process 900 may illustratively include an optional step 912 to which the process 900 advances following step 910 in embodiments in which the engine 10 is a gasoline-fueled engine. In embodiments of the process 900 which include step 912 (which embodiments also require the air handling system to include the air intake throttle 82), the processor 102 is operable to determine the current value of requested torque, RT, and to control the position of the air intake throttle 82 to a position at which the engine produces the requested engine output torque, RT, under current operating conditions of the ECT 28 and/or 66. In some embodiments, the processor 102 is operable to determine RT by monitoring and processing one or more signals produced by the accelerator pedal sensor 108 to determine RT. In other embodiments, the processor 102 may be operable to determine RT based on current fueling rate information produced by the fuel control module 150.

The process 900 may alternatively or additionally include another optional step 914 following step 912 or step 910. In embodiments which include step 914, the processor 102 is operable to determine a VGT position, $P_M$, relative to all possible VGT positions, which will result in a minimum exhaust gas temperature, and then control the current VGT position, $P_{VGT}$, to a position $P_{VGT} \neq P_M$. As described above with respect to the process 700 illustrated in FIG. 7, the VGT position $P_M$ is illustratively that which causes the turbine 32 and/or 70 to extract a maximum amount of energy, i.e., heat, from the exhaust gas. Thus, the processor 102 is illustratively operable at step 914 to control the VGT 32 and/or 70 to a position at which the turbine 32 and/or 70 extracts less than the maximum amount of energy from the exhaust gas. Further illustratively, the further from PM that the position of the VGT 32 and/or 70 is controlled, the more heat the exhaust gas will retain, and in some embodiments the processor 102 is operable to control the current VGT position, $P_{VGT}$ to a position which causes the turbine 32 and/or 70 to extract a minimum amount of energy, i.e., heat, from the exhaust gas which will contribute toward rapidly raising the operating temperature of the engine 10. In any case, the process 900 may further still include an optional step 916 at which the processor 102 is operable to delay for a time period $T_1$, e.g., for the purpose of providing a period of time for $CSOP_C$ to change as a result of the operations undertaken at step 910, step 912 and/or step 914. Following step 916 in embodiments which do not include any of steps 912-914, or from step 914 in embodiments which include step 914, the process 900 loops back to step 904.

If, at step 906, the processor 102 determines that the current value(s) of the cold start operating parameter(s), $CSOP_C$ is/are not indicative of a cold start condition, the process 900 advances to 920 where the processor 102 is operable to control the motor/generator 36 and/or 88 to discontinue operating as a motor. In some embodiments, the process 900 may further include an optional step 918 prior to step 920 in which the processor 102 is operable to delay for a time period T2, e.g., providing a period of time for the engine 10 to operate at $CSOP_T$ to ensure continued operation of the engine 10 at or above $CSOP_T$. $T_2$ may be any desired time period.

The process 900 may further include another optional step 922, which is illustratively included in embodiments which include either of the optional steps 912 and 914. At step 922, the processor 102 is operable to discontinue control of the air intake throttle 82 executed at step 912 and/or to discontinue control of the VGT 32 and/or 70 executed at step 914. Following step 922, or following step 920 in embodiments which do not include step 922 the process 900 terminates.

Figure 10:
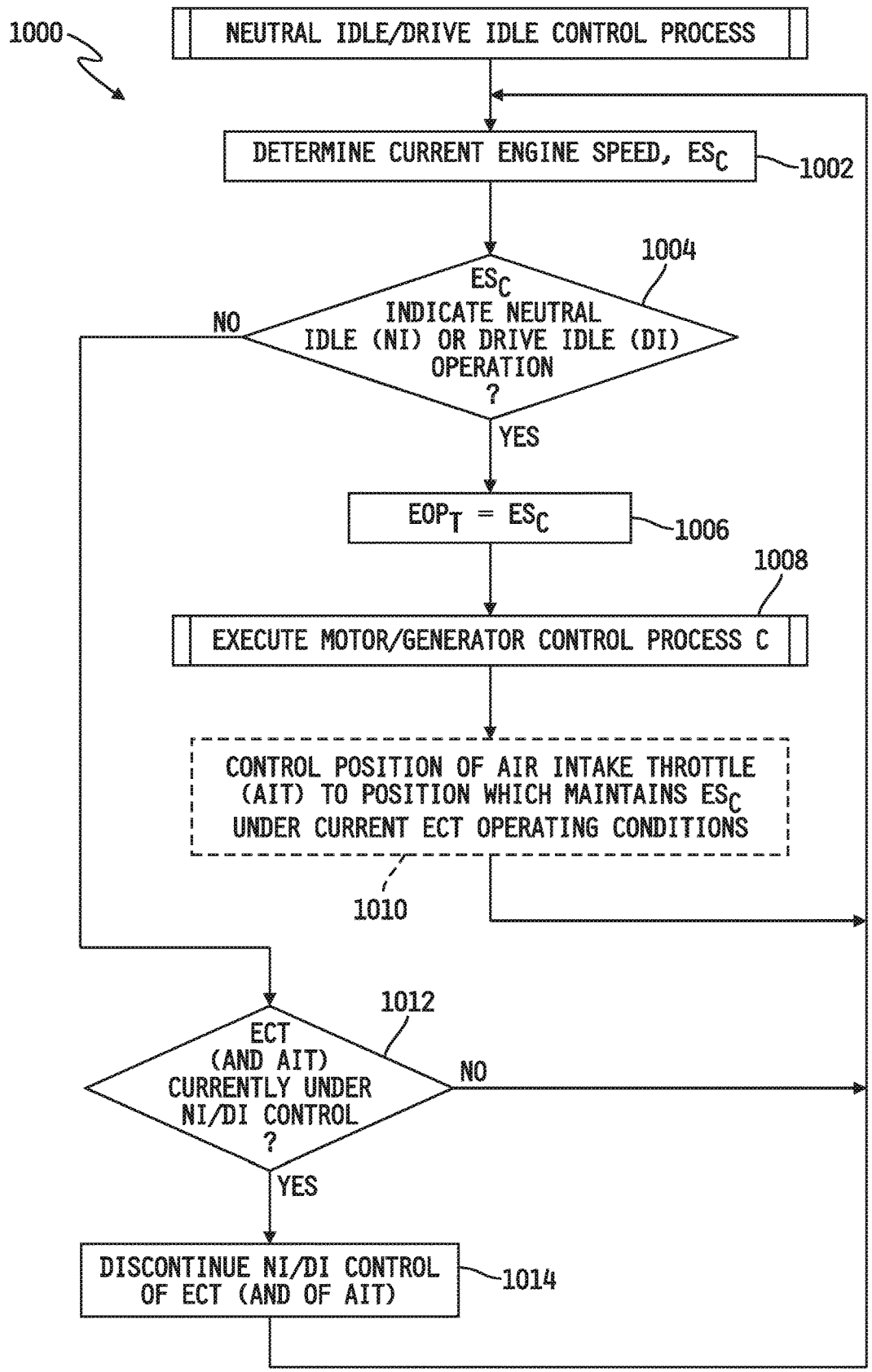
FIG. 10 is a simplified flow diagram of an embodiment of an Idle Control Process for controlling operation of the engine illustrated in FIG. 1A during neutral and/or drive idle operation.

Referring now to FIG. 10, a simplified flow diagram is shown of an embodiment of an Idle Control Process 1000 for controlling operation of the engine 10 during neutral and/or drive idle operation. The process 1000 is illustratively stored in the idle assist module 174 of the memory 104 in the form of instructions executable by the processor 102 of the ECU 100. The process 1000 begins at step 1002 where the processor 102 is operable to determine whether a current value of engine speed, $ES_C$, e.g., by monitoring and process one or more signals produced by the engine speed sensor 145. Thereafter at step 1004, the processor 102 is operable to determine whether $ES_C$ indicates neutral idle (NI) or drive idle (DI) operation. Illustratively, neutral idle is a condition in which the engine speed is within a specified range of engine idle speeds and the transmission 14 is in neutral, i.e., not engaged with any gear, and the drive idle is a condition in which the engine speed is within a specified range of engine idle speeds and the transmission 14 is currently engaged with a gear such that the engine 10 is under some amount of load. The processor 102 is illustratively operable to determine whether $ES_C$ indicates a neutral or drive idle condition by comparing $ES_C$ to a stored value or range of values of engine idle speed and by processing information transmitted or broadcast by the TCU 130 indicative of whether the transmission 14 is currently engaged with a transmission gear. In some alternative embodiments, the processor 102 is operable to determine whether the transmission 14 is currently engaged with a transmission gear by monitoring engine load, e.g., produced by the operating parameter estimation module based on current fueling values produced by the fuel control module 150. An example formula for computing engine load, EL, is EL=(current (%) fueling−no-load (%) fueling)/full (100%) load fueling. Those skilled in the art will recognize other formulas for computing engine load, EL, and any one or more such other formulas may be alternatively or additionally used by the processor 102 at step 1004 to determine engine load EL in embodiments in which the processor 102 requires EL at step 1004. In any case, if the processor 102 determines at step 1004 that the engine 10 is currently in neutral idle or drive idle operation, the process 1000 advances to step 1006 where the where the processor 102 is operable to set a target engine operating parameter, EOPT equal to $ES_C$. Following step 1006, the processor 102 is operable at step 1008 to execute the motor/generator control process C, an example of which is illustrated in FIG. 8 and which was described above in detail. Referring to FIG. 8, in embodiments thereof which include step 804, the processor 102 is operable to estimate, and to control the motor/generator 36 and/or 88 operating as a motor to attain and/or maintain, $ES_C$ using any of the one or more techniques described above with respect to step 806. For example, $RS_E$ is illustratively a rotational speed of the turbocharger shaft 30 and/or 68 which results in an engine speed of $ES_C$. In some embodiments, the process 800 may further include one or more steps for controlling the motor/generator 36 and/or 88 to cease operation as a motor and/or to operate as a generator, as needed, if for some reason the current value of engine speed $ES_C$ is or becomes too high.

The process 1000 may illustratively include an optional step 1010 to which the process 1000 advances following step 1008 in embodiments in which the engine 10 is a gasoline-fueled engine. In embodiments of the process 1000 which include step 1010 (which embodiments also require the air handling system to include the air intake throttle 82), the processor 102 is operable to control the position of the air intake throttle 82 to a position at which the engine maintains the engine speed $ES_C$ under current operating conditions of the ECT 28 and/or 66. Following step 1010, or following step 1008 in embodiments which do not include step 1010, the process 1000 loops back to step 1002.

If, at step 1004, the processor 102 determines that the engine 10 is not in a neutral idle or drive idle operation, the process 1000 advances to step 1012 where the processor 102 is operable to determine whether the ECT 28 and/or 66 is currently under NI or DI control, i.e., whether the motor/generator 36 and/or 70 is being controlled to operate as a motor pursuant to step 1008 and/or whether the air intake throttle 82 is being controlled pursuant to step 1010. If so, the process 1000 advances to step 1014 where the processor 102 is operable to discontinue control of the motor/generator 36 and/or 70 as a motor. In embodiments which include step 1010, the processor 102 is further operable at step 1014 to discontinue control of the air intake throttle executed at step 1010. Following step 1014, and following the "NO" branch of step 1012, the process 1000 loops back to step 1002.

Figure 11:
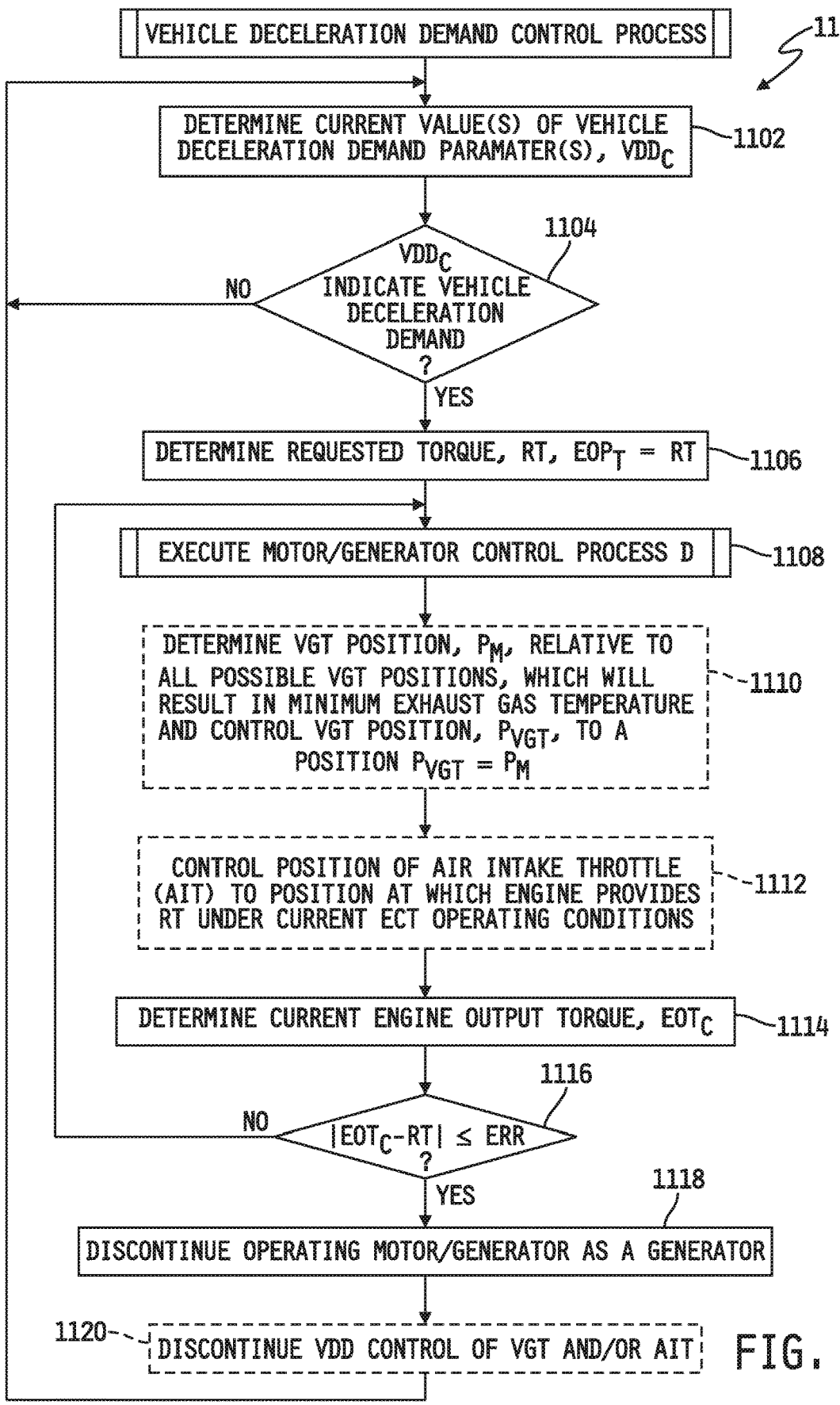
FIG. 11 is a simplified flow diagram of an embodiment of a Vehicle Deceleration Demand Control Process for controlling operation of the engine during vehicle deceleration conditions.

Referring now to FIG. 11, a simplified flow diagram is shown of an embodiment of a Vehicle Deceleration Demand Control process 1100 for controlling operation of the engine 10 during demanded or commanded vehicle deceleration conditions. The process 1100 is illustratively stored in the vehicle deceleration assist module 170 of the memory 104 in the form of instructions executable by the processor 102 of the ECU 100. The process 1100 begins at step 1102 where the processor 102 is operable to determine current values of one or more vehicle deceleration demand parameters, $VDD_C$. In some embodiments, $VDD_C$ may be or include one or any combination of measured and/or estimated operating parameters indicative of a demanded or commanded vehicle deceleration event. Examples of $VDD_C$ include, but are not limited to, one or any combination of brake pedal position and/or deflection rate, e.g., produced by the brake pedal position sensor 110, downshifting of the transmission 14 to a lower gear (higher gear ratio), e.g., broadcast or transmitted by the TCU 130 via the vehicle bus 138, accelerator pedal position and/or deflection rate, e.g., produced by the accelerator pedal position sensor 108, e.g., indicative of no requested engine output torque or a rapid change from some amount of accelerator pedal deflect to zero or near-zero deflection amount, or the like. Those skilled in the art will recognize other indicators of demanded or commanded vehicle deceleration, and inclusion of any such other indicators at step 1102 of the process 1100 is contemplated by this disclosure.

Following step 1102, the process 1100 advances to step 1104 where the processor 102 is operable to determine whether the current value(s) of the one or more demanded or commanded vehicle deceleration parameters, $VDD_C$ indicate(s) a demanded or commanded vehicle deceleration condition. Illustratively, the processor 102 is operable to execute step 1104 by comparing any one or combination of the foregoing signals and/or values $VDD_C$ with one or more corresponding threshold value(s) therefor, and concluding a demanded or command vehicle deceleration condition if the one or combination of $VDD_C$ signals and/or values exceed the one or more threshold value(s). Those skilled in the art will recognize that the one or more threshold value(s) may be any position, rate, gear ratio or other value indicative of a vehicle deceleration for which it may be desirable to take measures to control the ECT 28 and/or 66 in accordance with the process 1100.

If, at step 1104, the processor 102 determines that $VDD_C$ indicate(s) a demanded or commanded vehicle deceleration condition, the process 1100 advances to step 1106 where the processor 102 is operable to determine a requested engine output torque value, RT, and to set a target value of an engine operating parameter, $EOP_T$ equal to RT. Illustratively, the processor 102 is operable to determine RT at step 1106 by monitoring and processing one or more signals produced by the accelerator pedal sensor 108. Alternatively or additionally, the processor 102 may be operable to determine RT at step 1106 by monitoring and processing fueling signals produced by the fuel control module 150. In any case, the process 1100 advances from step 1106 to step 1108 where the processor 102 is operable to execute a motor/generator control process D, an example of which is illustrated in FIG. 14.

Figure 14:
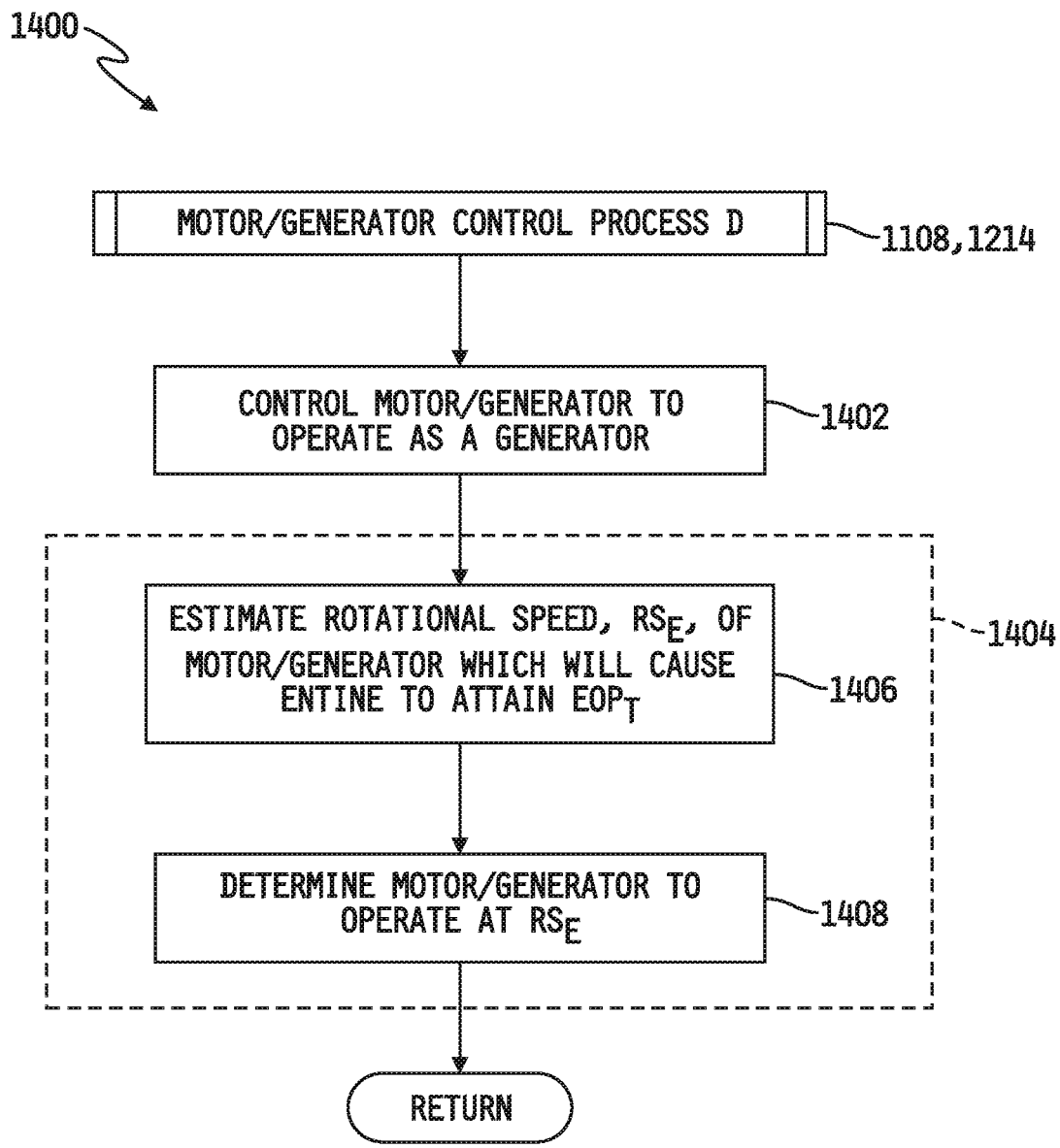
FIG. 14 is a simplified flow diagram of an embodiment of the Motor/Generator Control Process executed by the process illustrated in FIGS. 11 and 12.

Referring now to FIG. 14, a simplified flow diagram is shown of an embodiment of the motor/generator control process D 1400 executed at step 1108 of the process 1100 illustrated in FIG. 11. The process 1400 is illustratively stored in the electric machine control module 176 of the memory 104 in the form of instructions executable by the processor 102 of the ECU 100. The process 1400 begins at step 1402 where the processor 102 is operable to control the motor/generator 36 and/or 88 to operate as a generator. The processor 102 is illustratively operable to execute step 1402 to control the motor/generator 36 and/or 88 to operate as a generator by controlling or commanding the power controller 112 to extract energy, e.g., electrical current, from the coils 38 of the motor/generator 36 and/or the coils 90 of the motor/generator 88 to power source 114. Such extraction of electrical energy from the coils 38 and/or 90 causes the motor/generator 36 and/or 88 to apply a rotational retarding force to the turbocharger shaft 30 and/or 68 or, in other words, causes the turbocharger shaft 30 and/or 68 to apply a drive force to the motor/generator 36 and/or 88 against a resistance force thereof which, in any case, acts to decrease the rotational speed of the turbocharger shaft 30 and/or 68. With decreased rotational speed, boost produced by the turbocharger 28 and/or 66 is likewise decreased, as is the backpressure of exhaust gas acting on the turbine 32 and/or 70. The engine speed and/or engine output torque is thus decreased, and the vehicle 140 carrying the engine 10 and air handling system decelerates as a result of the rotational retarding force applied by the motor/generator 36 and/or 88 to the turbocharger shaft 30 and/or 68 when operating as a generator.

The process 1400 may optionally include step 1404, and in embodiments of the process 1400 which include step 1404 the processor 102 is operable at step 1406 to estimate the rotational speed, $RS_E$, of the motor/generator 36 and/or 88, i.e., the rotational speed of the turbocharger shaft 30 and/or 68 when being driven by the motor/generator 36 and/or 88 with the motor/generator 36 and/or 88 operating as a generator, which will cause the engine 10 to attain $EOP_T$, which was defined at step 1106 to be the requested engine output torque, RT. In some embodiments, the vehicle deceleration assist module 170 has stored therein one or more maps, tables, graphs, charts, lists and/or other data which maps turbocharger shaft speeds to engine output torque and/or engine speed at various operating conditions, and in such embodiments the processor 102 is operable to execute step 1406 by determining from such maps the turbocharger shaft speed required to achieve an exhaust gas temperature which will produce RT. In some alternate embodiments, the vehicle deceleration assist module 170 and/or the operating parameter estimation module 154 has stored therein one or more models for estimating $RS_E$ based on current engine and air handling system operating parameters, and in such embodiments the processor 102 is operable to execute step 1406 by executing such one or more models using current engine and air handling system parameter values. In any case, optional step 1404 advances from step 1406 to 1408 where the processor 102 is operable to control the motor/generator 36 and/or 88 to operate at $RS_E$, i.e., to operate as a generator with a turbocharger shaft 30 and/or 68 rotational speed of $RS_E$. Following step 1408, or following step 1402 in embodiments which do not include step 1404, the process 1400 is returned to step 1108 of the process 1100.

Referring again to FIG. 11, the process 1100 may illustratively include an optional step 1110 to which the process 1100 advances following step 1108. In embodiments which include step 1110, the processor 102 is operable to determine a VGT position, $P_M$, relative to all possible VGT positions, which will result in a minimum exhaust gas temperature, and then control the current VGT position, $P_{VGT}$, to a position $P_{VGT}=P_M$. The VGT position $P_M$ is illustratively that which causes the turbine 32 and/or 70 to extract a maximum amount of energy, i.e., heat, from the exhaust gas. This will cause the engine 10 to increase the amount of work done thereby to raise the exhaust gas energy, i.e., the temperature of the exhaust gas produced by the engine 10, thus imposing an additional retarding force on and to the engine 10. The processor 102 is therefore illustratively operable at step 1110 to control the VGT 32 and/or 70 to a position at which the turbine 32 and/or 70 extracts some amount of energy from the exhaust gas and, if and as necessary to achieve an engine output torque of RT, to control the VGT 32 and/or 70 to a $P_M$ at step 1110 to cause the turbine 32 and/or 70 to extract the maximum amount of energy from the exhaust gas.

The process 1100 may alternatively or additionally include another step 1112 following step 1110 or step 1108 in embodiments in which the engine 10 is a gasoline-fueled engine. In embodiments of the process 1100 which include step 1112 (which embodiments also require the air handling system to include the air intake throttle 82), the processor 102 is operable to control the position of the air intake throttle 82 to a position at which the engine 10 produces the requested engine output torque, RT, under current operating conditions of the ECT 28 and/or 66.

Following step 1108, or following step 1110 or step 1112 in embodiments which include either or both of steps 1110 and 1112, the process 1100 advances to step 1114 where the processor 102 is operable to determine a current value of engine output torque, $EOT_C$, i.e., the current output torque being produced by the engine 10. In some embodiments, the processor 102 is operable to execute step 1114 by estimating a current value of engine output torque, $EOT_C$, e.g., using a process stored in the operating parameter estimation module 154 to estimate EOTC based on one or more measured engine operating parameters, e.g., based a currently commanded fueling rate, a current engine speed value, $ES_C$, and/or one or more other operating parameters. Thereafter at step 1116, the processor 102 is operable to compare $EOT_C$ with RT, and if a difference between $EOT_C$ and RT is less than an acceptable error value, ERR, the process 1100 advances to step 1118, and otherwise the process 1100 loops back to step 1108.

At step 1118, the processor 102 has determined that the output torque being produced by the engine 10, $EOT_C$, is within an acceptable error limit of the requested torque, RT, and the processor 102 is thus operable to control the motor/generator 36 and/or 88 to discontinue operating as a generator. In embodiments of the process 1100 which include either of steps 1112 and 1114, the process 1100 illustratively includes an additional step 1120 at which the processor 102 is operable to control the VGT 32 and/or 70 discontinue operating in accordance with step 1110 and/or to control the air intake throttle 82 to discontinue operating in accordance with step 1112. Following step 1118, or following step 1120 in embodiments which include step 1120, the process 1100 loops back to step 1102.

Figure 12:
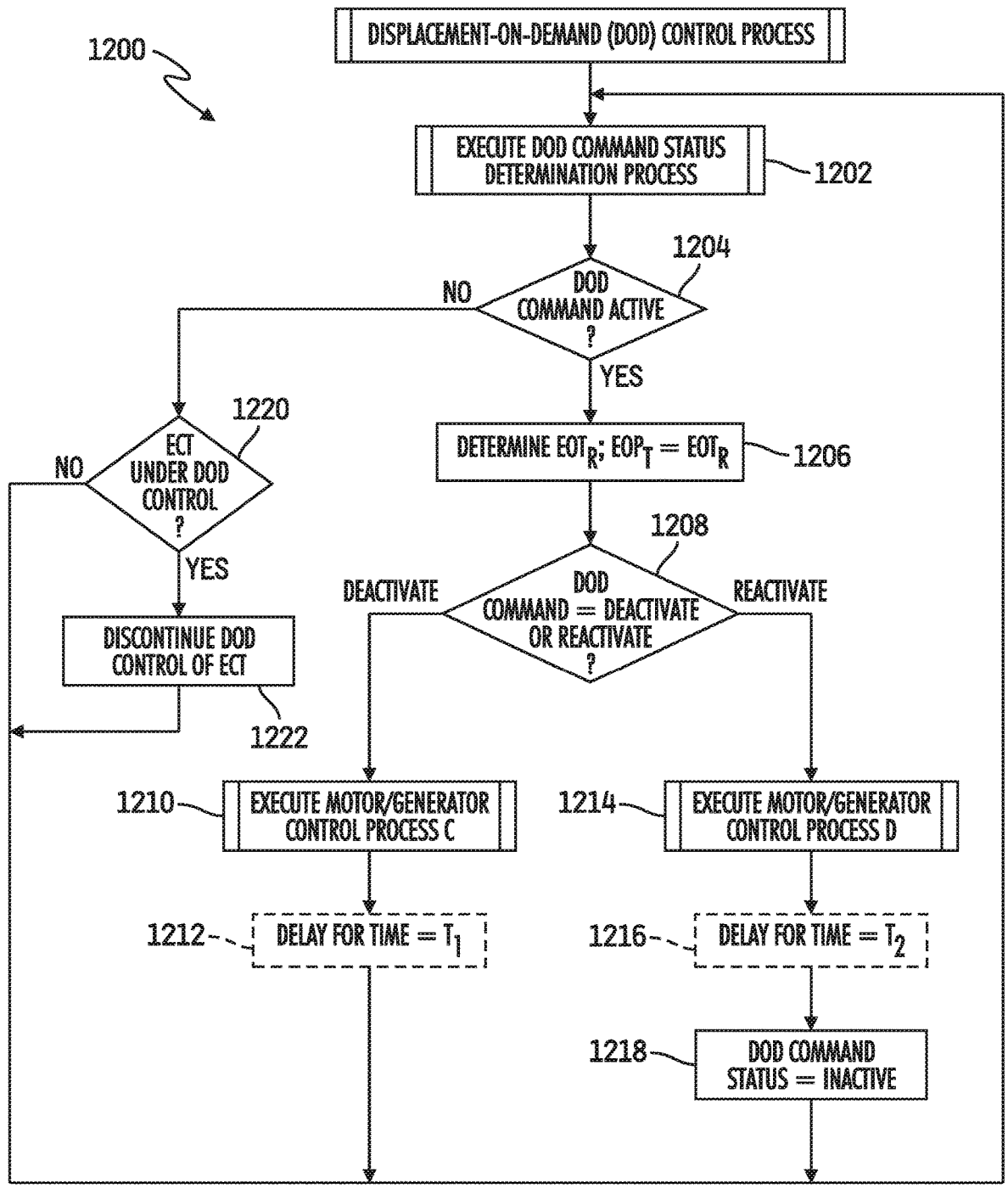
FIG. 12 is a simplified flow diagram of an embodiment of a Displacement-On-Demand Control Process for controlling operation of the engine during cylinder deactivation and/or reactivation events.

Referring now to FIG. 12, a simplified flow diagram is shown of an embodiment of a displacement-on-demand (DOD) control process 1200 for controlling operation of the engine 10 following deactivation and/or reactivation of one or more cylinders $11_1$-$11_K$ of the engine 10 for the purpose of smoothing out abrupt changes in engine output speed and/or engine output torque resulting from such cylinder deactivation and/or reactivation. The process 1200 is illustratively stored in the DOD assist module 172 of the memory 104 in the form of instructions executable by the processor 102 of the ECU 100. The process 1200 begins at step 1202 where the processor 102 is operable to execute a DOD command status determination process to determine whether a DOD command is currently active, i.e., whether one or more cylinder deactivation or reactivation events has been commanded and, if so, whether the currently active DOD command is a command for deactivation of one or more cylinders $11_1$-$11_K$ or a command for reactivation of one or more cylinders $11_1$-$11_K$ of the engine 10.

Figure 13:
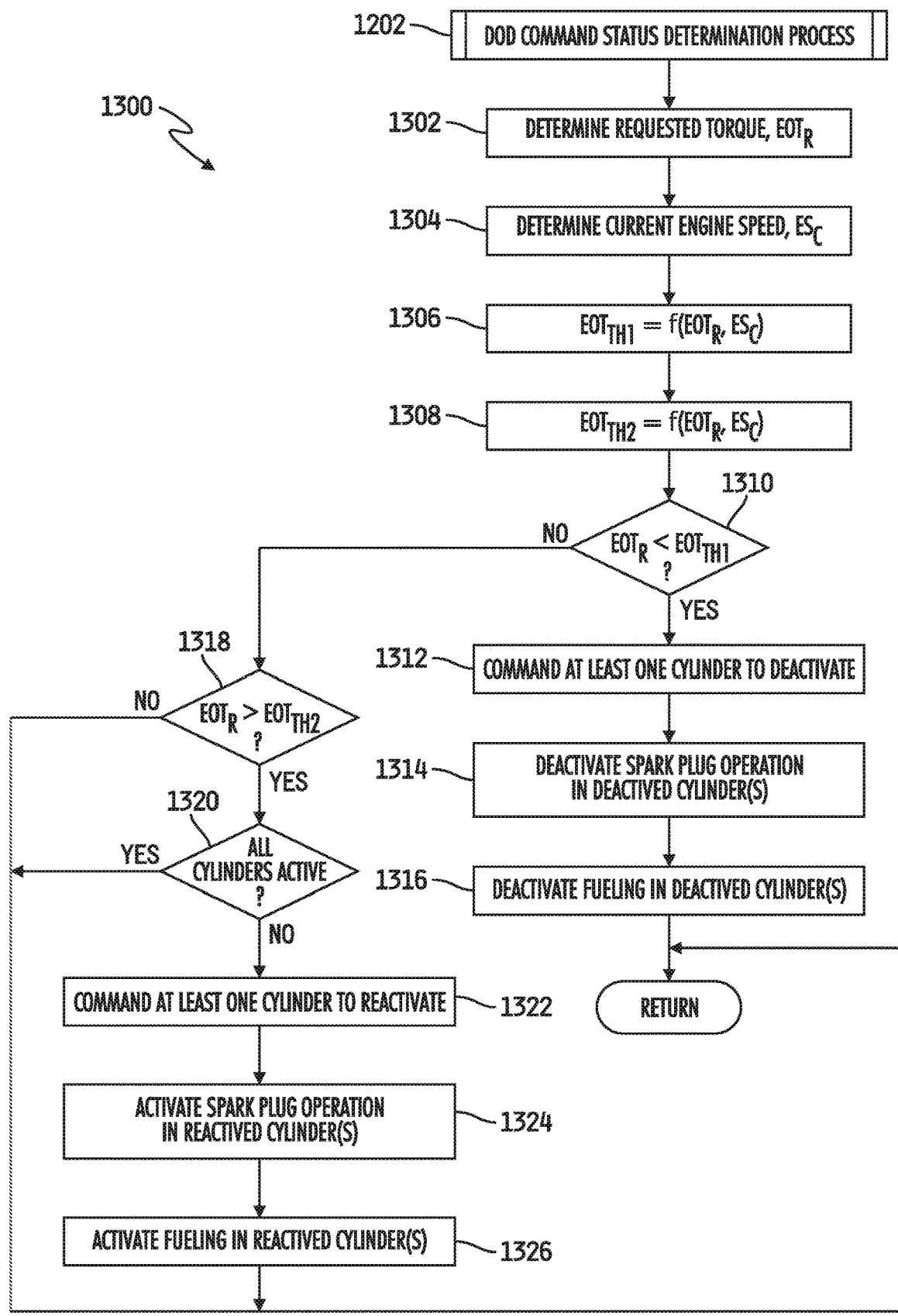
FIG. 13 is a simplified flow diagram of an embodiment of the DOD Command Status Determination Process executed by the process illustrated in FIG. 12.

Referring now to FIG. 13, a simplified flow diagram is shown of an embodiment 1300 of the DOD command status determination process executed at step 1202 of the process 1200 illustrated in FIG. 12. The process 1300 is illustratively stored in the DOD assist module 172 of the memory 104 in the form of instructions executable by the processor 102 of the ECU 100. The process 1300 begins at step 1302 where the processor 102 is operable to determine a current requested torque value, $EOT_R$, i.e., a current, requested value of output torque to be produced by the engine 10, and thereafter at step 1304 the processor 102 is operable to determine a current engine speed value, $ES_C$, i.e., a value of engine rotational speed at which the engine 10 is currently operating. In some embodiments, the processor 102 is operable to determine $EOT_R$ at step 1302 by monitoring and processing one or more signals produced by the accelerator pedal sensor 108, and in some embodiments, the processor 102 is operable to execute step 1304 by monitoring and processing one or more signals produced by the engine speed sensor 145 to determine $ES_C$. In some alternative embodiments, the processor 102 may be operable to execute step 1302 by estimating a current value of requested engine output torque, $EOT_R$, e.g., using a process stored in the operating parameter estimation module 154 to estimate $EOT_R$ based on one or more measured engine operating parameters, e.g., based a currently commanded fueling rate and/or other operating parameters.

Following step 1304, the process 1300 advances to step 1306 where the processor 102 is operable in some embodiments to determine an engine operating torque threshold value, $EOT_{TH1}$ as a function of $EOT_R$ and $ES_C$. Illustratively, $EOT_{TH1}$ represents an engine output torque value below which it is appropriate to command deactivation of at least one cylinder $11_1$-$11_K$ of the engine 10. Following step 1306, the processor 102 is operable in some embodiments to determine an engine operating torque threshold value, $EOT_{TH2}$ also as a function of $EOT_R$ and $ES_C$. Illustratively, $EOT_{TH2}$ represents an engine output torque value above which it is appropriate to command reactivation of at least one currently deactivated cylinder $11_1$-$11_K$ of the engine 10. In some embodiments, $EOT_{TH1}$ may be equal to $EOT_{TH2}$, and in other embodiments $EOT_{TH2}$ may be greater than $EOT_{TH1}$ to provide some amount of hysteresis therebetween.

In any case, the process 1300 advances from step 1308 to step 1310 where the processor 102 is operable to determine whether $EOT_R < EOT_{TH1}$. If so, the processor 102 determines that $EOT_R$ has met the criteria under the current operating conditions for deactivation of at least one cylinder $11_1$-$11_K$ of the engine 10, and thereafter at step 1310 the processor 102 is operable to command deactivation of at least one cylinder $11_1$-$11_K$ of the engine 10. Illustratively, the processor 102 is operable to execute step 1310 by controlling one or more of the displacement-on-demand (DOD) devices 120 illustrated in FIG. 1A to a deactivated state, i.e., an operating state in which the one or more DOD devices 120 act(s) to deactivate combustion operation of the one or more cylinders $11_1$-$11_K$ of the engine 10. Such a deactivation process may further include either or both of steps 1314 and 1316 at which the processor 102 is operable, in embodiments which the cylinders $11_1$-$11_K$ include spark plugs 118, to deactivate operation of the spark plug(s) 118 in the one or more deactivated cylinders $11_1$-$11_K$, and/or at which the processor 102 is operable to deactivate fueling in the one or more deactivated cylinders $11_1$-$11_K$. In the former case, the processor 102 may be operable to control spark plug deactivation by deactivating spark timing control thereof with the spark timing process stored in the spark timing control module 152 and executed by the processor 102, and in the latter case the processor 102 may be operable to control fueling deactivation by deactivating fueling thereof with the fuel control process stored in the fuel control module 150 and executed by the processor 102. In any case, following step 1316, the process 1300 is returned to step 1202 of the process 1200 illustrated in FIG. 12.

If, at step 1310, the processor 102 determines that the requested engine output torque value, $EOT_R$, is not less than the threshold engine output torque value, $EOT_{TH1}$, the process 1300 advances to step 1318 where the processor 102 is operable to determine whether $EOT_R > EOT_{TH2}$. If so, the processor 102 determines that $EOT_R$ has met the criteria under the current operating conditions for reactivation of at least one previously deactivated cylinder $11_1$-$11_K$ of the engine 10, and thereafter at step 1320 the processor 102 is operable to determine whether all cylinders $11_1$-$11_K$ of the engine 10 are active, i.e., are not currently deactivated. If so, the process 1300 is returned to step 1202 of the process 1200. Otherwise, the processor 102 is operable at step 1322 to command reactivation of at least one currently deactivated cylinder $11_1$-$11_K$ of the engine 10. Illustratively, the processor 102 is operable to execute step 1322 by controlling the displacement-on-demand (DOD) device 120 of at least one currently deactivated cylinder to an activated state, i.e., an operating state in which the one or more DOD devices 120 act(s) to activate combustion operation of the one or more cylinders $11_1$-$11_K$ of the engine 10. Such a reactivation process may further include either or both of steps 1324 and 1326 at which the processor 102 is operable, in embodiments which the cylinders $11_1$-$11_K$ include spark plugs 118, to reactivate operation of the spark plug(s) 118 in the one or more deactivated cylinders $11_1$-$11_K$, and/or at which the processor 102 is operable to reactivate fueling in the one or more deactivated cylinders $11_1$-$11_K$. In the former case, the processor 102 may be operable to control spark plug reactivation by reactivating spark timing control thereof with the spark timing process stored in the spark timing control module 152 and executed by the processor 102, and in the latter case the processor 102 may be operable to control fueling reactivation by reactivating fueling thereof with the fuel control process stored in the fuel control module 150 and executed by the processor 102. In any case, following step 1326, the process 1300 is returned to step 1202 of the process 1200 illustrated in FIG. 12.

Referring again to FIG. 12, the process 1200 advances from step 1202 to step 1204 where the processor 102 is operable to determine, e.g., based on the information determined at step 1202, whether a DOD command is currently active. If so, the process 1200 advances to step 1206 where the processor 102 is operable to determine a requested engine output torque value, RT, and to set a target value of an engine operating parameter, EOPT equal to RT. Illustratively, the processor 102 is operable to determine RT at step 1206 by monitoring and processing one or more signals produced by the accelerator pedal sensor 108. Alternatively or additionally, the processor 102 may be operable to determine RT at step 1206 by monitoring and processing fueling signals produced by the fuel control module 150. In any case, the process 1200 advances from step 1206 to step 1208 where the processor 102 is operable to determine, e.g., based on information determined at step 1202, whether the active DOD command is a command to deactivate at least one cylinder $11_1$-$11_K$ of the engine or to reactive at least one currently deactivated cylinder $11_1$-$11_K$. If the former, the processor 102 is operable at step 1210 to execute the motor/generator control process C for the purpose of controllably ramping up engine speed and/or engine output torque following the drop in engine speed and/or engine output torque accompanying the deactivation of one or more of the cylinders $11_1$-$11_K$. In some embodiments, the process 1200 may further include an optional step 1212 following step 1210 in which the processor 102 is operable to delay for a time period $T_1$, e.g., providing a period of time for the motor/generator control process C executed at step 1210 to smoothly transition engine speed and/or engine output torque to new values following deactivation of one or more of the cylinders $11_1$-$11_K$. $T_1$ may be any desired time period. The process 1200 loops from step 1210, or from step 1212 in embodiments which include step 1210, back to step 1202.

If, at step 1208, the processor 102 determines that the active DOD command determined at step 1202 is one to reactivate one or more currently deactivated cylinders $11_1$-$11_K$, the process 1200 advances to step 1214 where the processor 102 is operable to execute the motor/generator control process D for the purpose of controllably ramping down engine speed and/or engine output torque following the increase in engine speed and/or engine output torque accompanying the reactivation of one or more of the previously deactivated cylinders $11_1$-$11_K$. In some embodiments, the process 1200 may further include an optional step 1216 following step 1214 in which the processor 102 is operable to delay for a time period $T_2$, e.g., providing a period of time for the motor/generator control process D executed at step 1210 to smoothly transition engine speed and/or engine output torque to new values following reactivation of one or more of the previously deactivated cylinders $11_1$-$11_K$. $T_2$ may be any desired time period, and may or may not be equal to $T_1$. Following step 1214, or from step 1216 in embodiments which include step 1216, the process 1200 advances to step 1218 where the processor 102 is operable to set the DOD command status to inactive to indicate that at least one previously deactivated cylinder $11_1$-$11_K$ has been reactivated and control of the motor/generator 36 and/or 88 has been accomplished to assist transition of engine speed and/or engine output torque to new values thereof, and the process 1200 loops from step 1218 back to step 1202. If any cylinders $11_1$-$11_K$ remain deactivated after step 1218, the process executed at step 1202, e.g., the process 1300 illustrated in FIG. 13, will detect reactivation thereof if/when it occurs.

Figure 15:
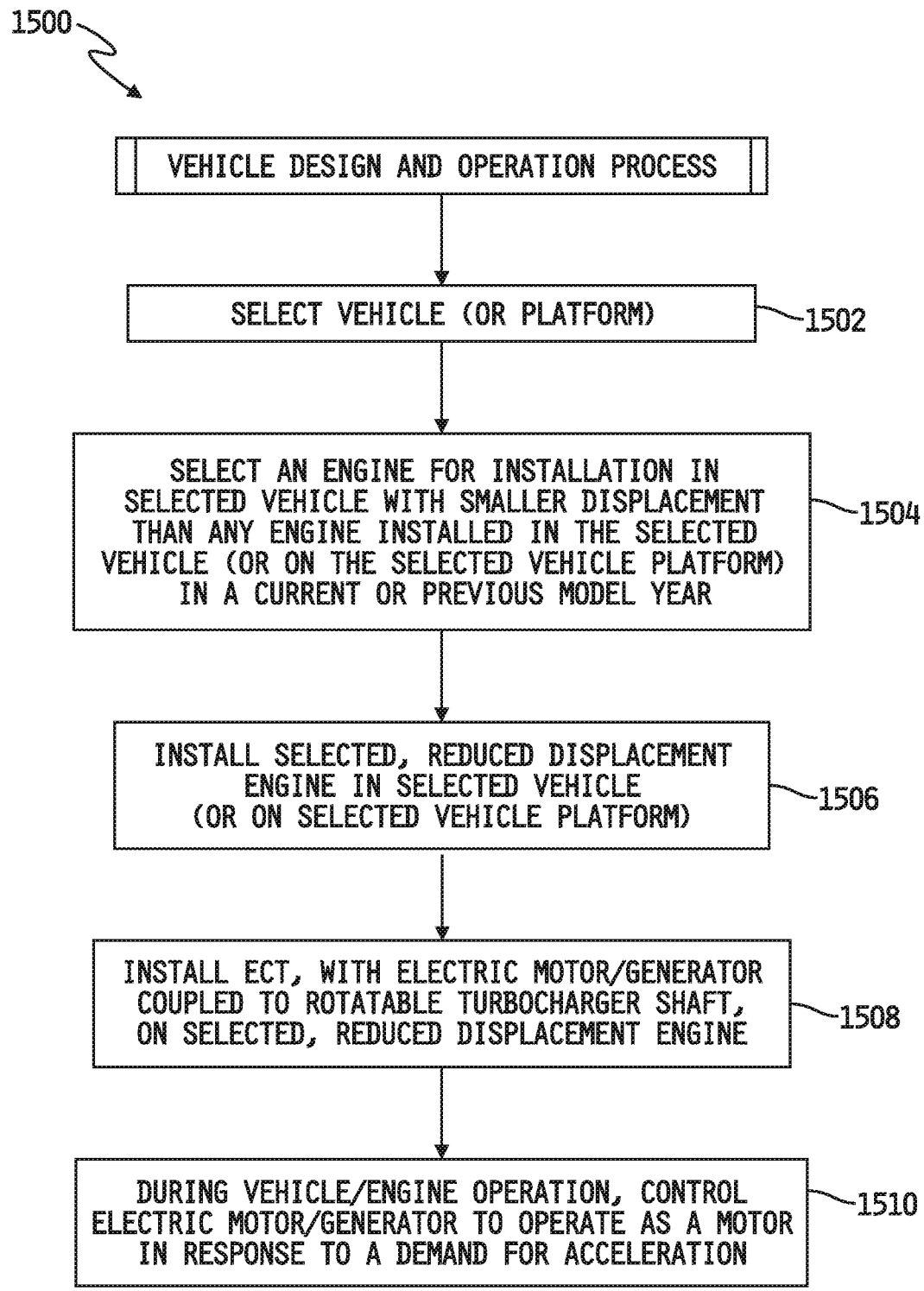
FIG. 15 is a simplified flow diagram of an embodiment of a Vehicle Design and Operation Process for designing fuel-efficient motor vehicles by integrating lower displacement engines with electronically controlled turbochargers.

Referring now to FIG. 15, a simplified flow diagram of an embodiment of a Vehicle Design and Operation Process 1500 for designing fuel-efficient motor vehicles by integrating lower displacement engines with electronically controlled turbochargers is shown. The process 1500 may illustratively be stored, at least in part, in a memory of a conventional computing, and at least some of the steps of the process 1500 may be executed by one or more processors of such a computing device. Examples of such a conventional computing device may include, but are not limited to, a personal computer (PC), laptop computer, notebook computer, tablet computer or other computer, whether or not networked with and to one or more other computing devices and/or server.

The process 1500 is directed to downsizing engine displacements while still providing desired torque response. This can improve fuel economy of the vehicle and aid a manufacturer of vehicles to improve their corporate average fuel economy. The process 1500 begins at step 1502 where a vehicle or vehicle platform is selected. Thereafter at step 1504, an engine is selected for installation in the selected vehicle or vehicle platform, wherein the selected engine has a smaller displacement than any engine installed in the selected vehicle or selected vehicle platform in a current or previous model year. Thereafter at step 1506, the selected, reduced displacement engine is installed in the selected vehicle or selected vehicle platform, and thereafter at step 1508 an ECT, e.g., one or a combination of the ECTs 28 and/or 66 illustrated in FIG. 1A and described in detail herein, i.e., one or a combination of turbochargers each with an electric motor/generator coupled to a rotatable turbocharger shaft thereof, is installed on the selected, reduced displacement engine. During subsequent operation of the foregoing engine and vehicle (or vehicle platform) combination, the one or more electric motor(s)/generator(s) is/are controlled as described herein to operate as a motor in response to a demand for vehicle acceleration. Because the ECT 28 and/or 66 is responsive to control of the motor/generator 36 and/or 88 to cause the engine to rapidly supply high amounts of engine output torque on demand, smaller displacement engines than would be conventionally specified for some vehicles and/or vehicle platforms may be installed and operated in such vehicles and/or vehicle platforms to meet engine output torque demands.

EXAMPLES

Illustrative examples of the systems and methods disclosed herein are provided below. An embodiment of the systems and methods may include any one or more, and/or any combination of, the examples described below.

Example 1 includes a system and a method for controlling an internal combustion engine during a shift event of a transmission coupled to an output shaft of the engine, and the engine has an electronically-controlled one of a turbocharger and exhaust-driven turbo supercharger fluidly coupled to an exhaust duct of the engine, which includes determining a target engine speed at the end of the shift event, and controlling electrical energy supplied to an electric machine, rotatably coupled to a rotatable shaft that is rotatably coupled to the electronically-controlled turbocharger or exhaust-driven turbo supercharger, to control rotation of the rotatable shaft to attain the target engine speed.

Example 2 includes the subject matter of example 1 and wherein controlling electrical energy comprises commanding the electric machine to operate as a generator during a first portion of the shift event when the engine is disengaged from the transmission.

Example 3 includes the subject matter of example 2 and wherein the electronically-controlled turbocharger or exhaust-driven turbo supercharger is part of an electronically-controlled turbocharger having a turbine coupled the rotatable shaft and a compressor coupled to the rotatable shaft, the compressor is fluidly coupled to an air intake of the engine, and the controlling the electrical energy further comprises commanding the electric machine to operate as a motor during a later portion of the shift event when the engine and transmission are being engaged.

Example 4 includes the subject matter of example 2 and wherein the shift event is an upshift.

Example 5 includes the subject matter of example 2 and wherein the shift event is a downshift.

Example 6 includes a system and a method for controlling an internal combustion engine during a shift event of a transmission coupled to an output shaft of the engine, and the engine has an electronically-controlled one of a turbocharger and exhaust-driven turbo supercharger fluidly coupled to an exhaust duct of the engine, which includes determining a target engine output torque through the shift event, and controlling electrical energy supplied to an electric machine rotatably coupled to a rotatable shaft of the electronically-controlled turbocharger or exhaust-driven turbo supercharger to control rotation of the rotatable shaft to attain the target engine output torque through the shift event.

Example 7 includes the subject matter of example 6 and wherein by controlling the engine output torque, an engine speed flare is avoided.

Example 8 includes the subject matter of example 6 and wherein the controlling electrical energy comprises commanding the electric machine to operate as a generator during a first portion of the shift event when the engine is disengaged from the transmission.

Example 9 includes the subject matter of example 6 and wherein the controlling electrical energy comprises commanding the electric machine to operate as a motor during a later portion of the shift event when the engine and transmission are being engaged.

Example 10 includes the subject matter of example 6 and wherein the shift event is an upshift.

Example 11 includes the subject matter of example 6 and wherein the shift event is a downshift.

Example 12 includes a system and a method for controlling an internal combustion engine during a shift event of a transmission coupled to an output shaft of the engine, the engine having an electronically-controlled turbocharger (ECT), the turbocharger having an electric machine rotatably coupled to a rotatable shaft, a turbine rotatably coupled to the rotatable shaft and the turbine fluidly coupled to an exhaust duct of the engine, and a compressor rotatably coupled to the rotatable shaft and the compressor fluidly coupled to an air intake duct of the engine, which includes determining a target engine speed at the end of the shift event, and controlling electrical energy supplied to the electric machine to control rotation of the rotatable shaft to attain the target engine speed wherein the target engine speed is attained smoothly through the shift event.

Example 13 includes the subject matter of example 12 and wherein the controlling electrical energy comprises commanding the electric machine to operate as a generator during a first portion of the shift event when the engine is disengaged from the transmission.

Example 14 includes the subject matter of example 13 and further includes commanding the electric machine to smoothly transition from an engine speed present during the shift event when the engine is disengaged from the transmission to the target engine speed.

Example 15 includes the subject matter of example 12 and wherein the electric machine is coupled to a power controller that is in turn coupled to a source of electrical power.

Example 16 includes the subject matter of example 12 and wherein the shift event is an upshift.

Example 17 includes the subject matter of example 12 and wherein the shift event is a downshift.

Example 18 includes a system and a method for controlling an internal combustion engine during a shift event of a transmission coupled to an output shaft of the engine, and the engine has an electronically-controlled one of a turbocharger and exhaust-driven turbo supercharger fluidly coupled to an exhaust duct of the engine, which includes determining a target engine speed at the end of the shift event, controlling electrical energy supplied to an electric machine rotatably coupled to a rotatable shaft of the electronically-controlled turbocharger or exhaust-driven turbo supercharger to control rotation of the rotatable shaft to attain the target engine speed, and commanding spark timing to a spark plug disposed in a combustion chamber of the engine to minimum spark advance for best torque during at least a first portion of the shift event when the engine is disengaged from the transmission.

Example 19 includes the subject matter of example 18 and wherein the controlling electrical energy comprises commanding the electric machine to operate as a generator during a first portion of the shift event when the engine is disengaged from the transmission.

Example 20 includes the subject matter of example 19 and further includes commanding the electric machine to smoothly transition from an engine speed present during the shift event when the engine is disengaged from the transmission to the desired engine speed.

Example 21 includes the subject matter of example 18 and wherein the controlling electrical energy comprises commanding the electric machine to operate as a motor during a later portion of the shift event when the engine and transmission are being engaged.

Example 22 includes a system and a method for controlling an internal combustion engine and a transmission coupled to an output shaft of the engine, and the engine has an electronically-controlled turbocharger (ECT), the turbocharger has an electric machine coupled to a shaft, a turbine coupled to the shaft and the turbine is disposed in an exhaust of the engine, and a compressor coupled to the shaft and the compressor is disposed in an intake of the engine, which includes commanding an operating gear to the transmission based on the lowest brake specific fuel consumption (BSFC), and commanding the electric machine of the ECT to operate as a motor in response to a demand for increased engine torque.

Example 23 includes the subject matter of example 22 and further includes discontinuing commanding the electric machine of the ECT to operate as a motor when the engine has attained the demanded increased engine torque.

Example 24 includes the subject matter of example 22 and further includes commanding the electric machine of the ECT to operate as a motor when the engine has attained the demanded increased engine torque.

Example 25 includes a system and a method for controlling an internal combustion engine and a transmission coupled to an output shaft of the engine, and the engine has an electronically-controlled turbocharger (ECT), and the turbocharger has an electric machine coupled to a shaft, a turbine coupled to the shaft and the turbine is disposed in an exhaust duct of the engine, and a compressor coupled to the shaft and the compressor is disposed in an intake duct of the engine, which includes commanding an operating gear to the transmission based on the lowest BSFC, and commanding the electric motor to apply additional torque to the shaft of the ECT in response to a demand for increased engine torque.

Example 26 includes the subject matter of example 25 and wherein the additional torque supplied to the shaft of the ECT results in one of a positive torque, zero torque, and a torque that is less negative than prior to the commanding of the electric motor.

Example 27 includes the subject matter of example 25 and further includes reducing the torque that the electric machine applies to the shaft of the ECT as the engine attains the demanded increased engine torque.

Example 28 includes the subject matter of example 25 and wherein the reducing the torque that the electric machine applies to the shaft of the ECT is comparatively one of a lesser positive torque, zero torque, and a negative torque, than before the reducing.

Example 29 includes a system and a method for increasing corporate average fuel economy, which includes installing a reduced displacement internal combustion engine on a vehicle platform, such reduced displacement being smaller than any engine provided on such vehicle platform in a prior model year, and providing the reduced displacement internal combustion engine with an electronically-controlled turbocharger (ECT).

Example 30 includes the subject matter of example 29 and wherein the ECT includes a compressor disposed in an engine intake, a turbine disposed in an engine exhaust, a shaft onto which the compressor and turbine are couple, and an electric motor also coupled to the shaft, and the electric machine has the capability to be operated as a motor and as a generator, and the electric machine is commanded to operate as a motor upon a demand for acceleration of one of the vehicles.

Example 31 includes a system and a method for operating an internal combustion engine, the engine has a compressor disposed in an intake of the engine and has an exhaust aftertreatment device and a turbine disposed in an exhaust of the engine, wherein the compressor and turbine are part of an electronically-controlled turbocharger that further includes an electric machine with the turbine, compressor, and electric machine coupled to a shaft, which includes estimating a temperature in the aftertreatment device, and commanding the electric machine to operate as a motor when it is estimated that temperature in the aftertreatment device is lower than desired.

Example 32 includes the subject matter of example 31 and wherein the turbine is a variable geometry turbine, and which further includes estimating a position to command to the variable geometry turbine that yields an exhaust temperature that is lowest of the available positions for the variable geometry turbine, and commanding the variable geometry turbine to assume a position that is substantially different than the position that yields the lowest temperature.

Example 33 includes the subject matter of example 31 and further includes determining a demanded engine torque, and adjusting a throttle valve disposed in an engine intake to provide the demanded engine torque.

Example 34 includes the subject matter of example 31 and further includes determining a demanded engine torque, and further basing the commanding of the electric machine so as to provide the demanded engine torque.

Example 35 includes a system and a method for operating an internal combustion engine, the engine has a throttle valve and a compressor disposed in an intake of the engine and has an exhaust aftertreatment device and a turbine disposed in an exhaust of the engine wherein the compressor and turbine are part of an electronically-controlled turbocharger that further includes an electric machine with the turbine, compressor, and electric machine coupled to a shaft, which includes determining that the engine is undergoing a cold start, and commanding the electric machine to operate as a motor in response to the cold start determination.

Example 36 includes the subject matter of example 35 and further includes determining a demand for engine torque, and moving the throttle valve toward a more closed position substantially concurrently with operating the electric machine as a motor wherein the moving of the throttle valve and the commanding of the electric machine are accomplished in such a way as to provide the demanded engine torque.

Example 37 includes the subject matter of example 35 and further includes determining a demand for engine torque, determining a first throttle valve position to provide the engine torque in which no current is applied to coils of the electric machine, and commanding a second throttle valve position to the throttle valve wherein said second throttle valve position is more closed than the first throttle valve position and said electric machine is commanded to operate as a motor in a manner so as to cause the engine to provide the demanded engine torque.

Example 38 includes the subject matter of example 35 and further includes determining that the engine is sufficiently warm to be out of cold start, and discontinuing operating the electric machine as a motor in response to a determination that the engine is sufficiently warm to be out of cold start.

Example 39 includes the subject matter of example 36 and wherein the turbine is a variable geometry turbine, and further includes determining a position to command to the variable geometry turbine that yields an exhaust temperature that is lowest of the available positions for the variable geometry turbine, and commanding the variable geometry turbine to assume a position that is substantially different than the position that yields the lowest temperature.

Example 40 includes a system and a method for controlling an internal combustion engine, the engine has a throttle valve and a compressor disposed in an intake of the engine and has an exhaust aftertreatment device and a turbine disposed in an exhaust of the engine wherein the compressor and turbine are part of an electronically-controlled turbocharger that further includes an electric machine with the turbine, compressor, and electric machine coupled to a shaft, which includes estimating that temperature within a cylinder of the engine, and commanding the electric machine to operate as a motor when the temperature is lower than a threshold temperature.

Example 41 includes a system and a method for operating a vehicle system having an internal combustion engine disposed therein, the engine has a compressor disposed in an intake of the engine and a turbine disposed in an exhaust of the engine wherein the compressor and turbine are part of an electronically-controlled turbocharger that further includes an electric machine with the turbine, compressor, and electric machine mechanically coupled to a shaft, which includes commanding the electric machine to operate as a motor when the engine is at one of neutral idle and drive idle.

Example 42 includes the subject matter of example 41 and wherein the engine has a throttle valve disposed in the intake of the engine, which further includes closing the throttle valve so that the engine output matches the one of neutral idle and drive idle.

Example 43 includes the subject matter of example 41 and wherein commanding the electric machine includes controlling current provided to coils of the electric machine, which further includes adjusting the current provided to the coils of the electric machine to maintain a substantially constant engine speed.

Example 44 includes the subject matter of example 43 and further includes basing the adjusting the current on a signal from an engine speed sensor.

Example 45 includes the subject matter of example 43 and further includes basing the adjusting the current on a signal from at least one sensor associated with the engine.

Example 46 includes a system and a method for operating an internal combustion engine, the engine has a compressor disposed in an intake of the engine and having an exhaust aftertreatment device and a turbine disposed in an exhaust of the engine wherein the compressor and turbine are part of an electronically-controlled turbocharger that further includes an electric machine with the turbine, compressor, and electric machine coupled to a shaft, which includes commanding the electric machine to operate as a generator in response to a demand for deceleration of a vehicle into which the engine is disposed.

Example 47 includes a system and a method for operating an internal combustion engine disposed in a vehicle, the engine has a compressor disposed in an intake of the engine and has an a turbine disposed in an exhaust of the engine wherein the compressor and turbine are part of an electronically-controlled turbocharger that further includes an electric machine with the turbine, compressor, and electric machine coupled to a shaft, and the vehicle has a brake pedal, which includes commanding the electric machine to operate as a generator in response to a signal indicating that the brake pedal has been depressed.

Example 48 includes the subject matter or example 47 and further includes determining a demand for engine torque, and discontinuing the command to the electric machine to operate as a generator when present torque substantially equals the demanded torque.

Example 49 includes a system and a method for operating an internal combustion engine, the engine has a compressor disposed in an intake of the engine and has an exhaust aftertreatment device and a turbine disposed in an exhaust of the engine wherein the compressor and turbine are part of an electronically-controlled turbocharger that further includes an electric machine with the turbine, compressor, and electric machine coupled to a shaft, which includes determining a demand for engine torque, and commanding the electric machine to operate as a generator in response to a demand for engine torque that is significantly less than a present engine torque.

Example 50 includes the subject matter of example 49 and further includes discontinuing the command to the electric machine to operate as a generator when present torque substantially equals the demanded torque.

Example 51 includes a system and a method for controlling a displacement-on-demand, internal-combustion engine wherein the engine has a plurality of cylinders and at least one of the cylinders is deactivatable, the engine has an electronically-controlled turbocharger (ECT), the turbocharger has an electric machine coupled to a shaft, a turbine mechanically coupled to the shaft with the turbine disposed in an exhaust duct of the engine, and a compressor mechanically coupled to the shaft with the compressor disposed in an intake duct of the engine, which includes commanding the electric machine of the ECT to operate as a motor when at least one of the cylinders is commanded to deactivate.

Example 52 includes the subject matter of example 51 and further includes commanding the electric machine of the ECT to operate as a generator when at least one of the cylinders is commanded to reactivate.

Example 53 includes the subject matter of example 51 and further includes determining a demand for engine torque, determining a present engine speed, and deactivating at least one engine cylinder based on the demand for engine torque being less than a threshold engine torque at the present engine speed wherein the commanding the electric machine of the ECT is accomplished so as to maintain the engine torque substantially constant during the cylinder deactivation.

Example 54 includes the subject matter of example 53 and wherein the deactivating includes at least one of discontinuing an actuation signal to a spark plug disposed in the at least one engine cylinder, and discontinuing an actuation signal to a fuel injector associated with the at least one engine cylinder.

Example 55 includes a system and a method for controlling a displacement-on-demand, internal-combustion engine wherein the engine has a plurality of cylinders and at least one of the cylinders is deactivatable, the engine has an electronically-controlled turbocharger (ECT), the turbocharger has an electric machine coupled to a shaft, a turbine mechanically coupled to the shaft with the turbine disposed in an exhaust duct of the engine, and a compressor mechanically coupled to the shaft with the compressor disposed in an intake duct of the engine, which includes commanding the electric machine of the ECT to operate as a generator when at least one of the cylinders is commanded to reactivate.

Example 56 includes the subject matter of example 55 further including determining a demand for engine torque, determining a present engine torque, and reactivating at least one engine cylinder based on the demand for engine torque being greater than a threshold engine torque at the present engine speed wherein the commanding the electric machine of the ECT is accomplished so as to maintain the engine torque substantially constant during the cylinder reactivation.

Example 57 includes the subject matter of example 56 and wherein reactivating includes at least one of providing an actuation signal to a spark plug disposed in the at least one engine cylinder, and providing an actuation signal to a fuel injector associated with the at least one engine cylinder.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A method of controlling an electric machine rotatably coupled to a rotatable shaft of an electronically-controlled one of a turbocharger and an exhaust-driven turbo supercharger fluidly coupled to an exhaust manifold of an internal combustion engine, the method comprising:
   determining or estimating an operating temperature of the engine or of a component fluidly coupled to the exhaust manifold or an intake manifold of the engine,
   comparing the determined or estimated operating temperature to a threshold temperature, and
   in response to the determined or estimated operating temperature being below the threshold temperature, increasing the operating temperature of the engine or a temperature of exhaust gas produced by the engine by controlling the electric machine to operate as a motor, and otherwise not controlling, or discontinuing controlling of, the electric machine to operate as a motor,
   wherein the turbocharger or exhaust-driven turbo supercharger includes a turbine having an exhaust gas inlet fluidly coupled to the exhaust manifold of the engine by an exhaust gas conduit,
   and wherein the component is an exhaust gas aftertreatment device fluidly coupled to the exhaust gas conduit,
   and wherein a temperature sensor is configured to produce a temperature signal corresponding to an operating temperature of the aftertreatment device,
   and wherein determining or estimating the operating temperature comprises determining the operating temperature of the aftertreatment device based on the temperature signal produced by the temperature sensor,
   and wherein the temperature of the exhaust gas produced by the engine is increased by controlling the electric machine to operate as a motor in response to the operating temperature of the aftertreatment device being below the threshold temperature to thereby increase the operating temperature of the aftertreatment device,
   and wherein the turbine is a variable geometry turbine having a plurality of commandable geometries each producing a different turbine geometry, and
   with the electric machine operating as a motor, the method further comprising:
   determining the one of the plurality of commandable geometries of the variable geometry turbine that will yield the lowest temperature of exhaust gas passing therethrough, and
   commanding the variable geometry turbine to one of the plurality of commandable geometries other than the one of the plurality of commandable geometries that will yield the lowest temperature of exhaust gas passing through the variable geometry turbine.

2. The method of claim 1, wherein the engine includes an air intake conduit fluidly coupled to the air intake manifold of the engine, and an electronically controllable air intake throttle is disposed within the air intake conduit,
   and with the electric machine operating as a motor, the method further comprising:
   determining a demanded engine output torque, and
   controlling a position of the air intake throttle to a position that provides the demanded engine output torque.

3. The method of claim 1, wherein the method further comprises determining a demanded engine output torque, and wherein controlling the electric machine to operate as a motor comprises controlling the electric machine to operate as a motor in a manner which produces the demanded engine output torque.

4. A method of controlling an electric machine rotatably coupled to a rotatable shaft of an electronically-controlled one of a turbocharger and an exhaust-driven turbo supercharger fluidly coupled to an exhaust manifold of an internal combustion engine, the method comprising:
determining or estimating an operating temperature of the engine or of a component fluidly coupled to the exhaust manifold or an intake manifold of the engine,
comparing the determined or estimated operating temperature to a threshold temperature, and
in response to the determined or estimated operating temperature being below a threshold temperature, increasing the operating temperature of the engine or a temperature of exhaust gas produced by the engine by controlling the electric machine to operate as a motor, and otherwise not controlling, or discontinuing controlling of, the electric machine to operate as a motor,
wherein the turbocharger or exhaust-driven turbo supercharger includes a turbine having an exhaust gas inlet receiving exhaust gas directly from the engine or from an upstream turbine and an exhaust gas conduit fluidly coupled to an exhaust gas outlet of the turbine,
and wherein the component is an exhaust gas aftertreatment device fluidly coupled to the exhaust gas conduit,
and wherein a temperature sensor is configured to produce a temperature signal corresponding to an operating temperature of the aftertreatment device,
and wherein determining or estimating the operating temperature comprises determining the operating temperature of the aftertreatment device based on the temperature signal produced by the temperature sensor,
and wherein the temperature of the exhaust gas produced by the engine is increased by controlling the electric machine to operate as a motor in response to the operating temperature of the aftertreatment device being below the threshold temperature to thereby increase the operating temperature of the aftertreatment device,
and wherein the turbine is a variable geometry turbine having a plurality of commandable geometries each producing a different turbine geometry, and
with the electric machine operating as a motor, the method further comprising:
determining the one of the plurality of commandable geometries of the variable geometry turbine that will yield the lowest temperature of exhaust gas passing therethrough, and
commanding the variable geometry turbine to one of the plurality of commandable geometries other than the one of the plurality of commandable geometries that will yield the lowest temperature of exhaust gas passing through the variable geometry turbine.

5. The method of claim 4, wherein the engine includes an air intake conduit fluidly coupled to the air intake manifold of the engine, and an electronically controllable air intake throttle is disposed within the air intake conduit,
and with the electric machine operating as a motor, the method further comprising:
determining a demanded engine output torque, and
controlling a position of the air intake throttle to a position that provides the demanded engine output torque.

6. The method of claim 4, wherein the method further comprises determining a demanded engine output torque, and wherein controlling the electric machine to operate as a motor comprises controlling the electric machine to operate as a motor in a manner which produces the demanded engine output torque.

7. A method of controlling an electric machine rotatably coupled to a rotatable shaft of an electronically-controlled one of a turbocharger and an exhaust-driven turbo supercharger fluidly coupled to an exhaust manifold of an internal combustion engine, the method comprising:
determining or estimating an operating temperature of the engine or of a component fluidly coupled to the exhaust manifold or an intake manifold of the engine,
comparing the determined or estimated operating temperature to a threshold temperature,
in response to the determined or estimated operating temperature being below a threshold temperature, increasing the operating temperature of the engine or a temperature of exhaust gas produced by the engine by controlling the electric machine to operate as a motor, and otherwise not controlling, or discontinuing controlling of, the electric machine to operate as a motor,
monitoring an ignition system of the engine, and
executing the determining or estimating, comparing and controlling steps in response to determining that the ignition system is starting the engine,
wherein the threshold temperature corresponds to a cold start threshold temperature,
and wherein the component is a cylinder of the engine,
and wherein determining or estimating the operating temperature comprises estimating the operating temperature of the cylinder of the engine,
and wherein the operating temperature of the engine is increased by controlling the electric machine to operate as the motor in response to the operating temperature of the cylinder of the engine being below the cold start threshold temperature.

8. A method of controlling an electric machine rotatably coupled to a rotatable shaft of an electronically-controlled one of a turbocharger and an exhaust-driven turbo supercharger fluidly coupled to an exhaust manifold of an internal combustion engine, the method comprising:
determining or estimating an operating temperature of the engine or of a component fluidly coupled to the exhaust manifold or an intake manifold of the engine,
comparing the determined or estimated operating temperature to a threshold temperature,
in response to the determined or estimated operating temperature being below a threshold temperature, increasing the operating temperature of the engine or a temperature of exhaust gas produced by the engine by controlling the electric machine to operate as a motor, and otherwise not controlling, or discontinuing controlling of, the electric machine to operate as a motor,
monitoring an ignition system of the engine, and
executing the determining or estimating, comparing and controlling steps in response to determining that the ignition system is starting the engine,
wherein the threshold temperature corresponds to a cold start threshold temperature,
and wherein the component is an exhaust gas conduit fluidly coupled to the exhaust manifold of the engine,
and wherein determining or estimating the operating temperature comprises estimating the temperature of exhaust gas flowing through the exhaust gas conduit,
and wherein the temperature of the exhaust gas produced by the engine is increased by controlling the electric machine to operate as the motor in response to the operating temperature of the exhaust gas flowing through the exhaust gas conduit being below the cold start threshold temperature.

9. A method of controlling an electric machine rotatably coupled to a rotatable shaft of an electronically-controlled one of a turbocharger and an exhaust-driven turbo supercharger fluidly coupled to an exhaust manifold of an internal combustion engine, the method comprising:

determining or estimating an operating temperature of the engine or of a component fluidly coupled to the exhaust manifold or an intake manifold of the engine, comparing the determined or estimated operating temperature to a threshold temperature, in response to the determined or estimated operating temperature being below a threshold temperature, increasing the operating temperature of the engine or a temperature of exhaust gas produced by the engine by controlling the electric machine to operate as a motor, and otherwise not controlling, or discontinuing controlling of, the electric machine to operate as a motor, monitoring an ignition system of the engine, and executing the determining or estimating, comparing and controlling steps in response to determining that the ignition system is starting the engine, wherein the threshold temperature corresponds to a cold start threshold temperature, and wherein an ambient humidity sensor is configured to produce a humidity signal corresponding to an ambient humidity of an environment of a motor vehicle carrying the engine, the method further comprising:

determining a relative humidity of the environment of the motor vehicle based on the humidity signal, and controlling the electric machine to operate as a motor in response to the determined or estimated temperature of the component being below the cold start threshold temperature and the relative humidity of the environment of the motor vehicle being indicative of a cold ambient environment.

* * * * *